US009066301B2

(12) United States Patent
Santhanam et al.

(10) Patent No.: US 9,066,301 B2
(45) Date of Patent: Jun. 23, 2015

(54) MANAGING A REVERSE LINK TRANSMISSION POWER LEVEL SETPOINT DURING PERIODS OF INACTIVITY ON THE REVERSE LINK IN A WIRELESS COMMUNICATIONS SYSTEM

(75) Inventors: Arvind V. Santhanam, San Diego, CA (US); Mark A. Maggenti, San Diego, CA (US); Harleen K. Gill, San Diego, CA (US); Rajan Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1223 days.

(21) Appl. No.: 12/751,641

(22) Filed: Mar. 31, 2010

(65) Prior Publication Data

US 2010/0260086 A1    Oct. 14, 2010

Related U.S. Application Data

(60) Provisional application No. 61/167,707, filed on Apr. 8, 2009.

(51) Int. Cl.
*H04B 7/00*     (2006.01)
*H04W 52/12*    (2009.01)
(Continued)

(52) U.S. Cl.
CPC .......... *H04W 52/12* (2013.01); *H04W 52/0222* (2013.01); *H04W 52/146* (2013.01);
(Continued)

(58) Field of Classification Search
CPC .................... H04W 52/0232; H04W 52/0261; H04W 52/04; H04W 52/143; H04W 52/146
USPC ........... 370/318, 342, 328, 335, 277; 455/522
See application file for complete search history.

(56) References Cited

U.S. PATENT DOCUMENTS 5,896,411 A * 4/1999 Ali et al. .................. 375/130
6,163,707 A * 12/2000 Miller ...................... 455/522
(Continued)

FOREIGN PATENT DOCUMENTS

CN      101208976 A    6/2008
JP      2003086233 A   3/2003
(Continued)

OTHER PUBLICATIONS

3rd Generation Partnership Project; Technical Specification Group Radio Access Network; Continuous connectivity for packet data users (Release 7) 3GPP Standard; 3GPP TR 25.903, 3rd Generation Partnership Project (3GPP), Mobile Competence Centre ; 650, Route Des Lucioles ; F-06921 Sophia-Antipolis Cedex ; France, no. V7.0.0, Mar. 1, 2007, pp. 1-138, XP050369325 pp. 31-35,45 pp. 51,72 p. 131.
(Continued)

*Primary Examiner* — Ricky Ngo
*Assistant Examiner* — Dewanda Samuel
(74) *Attorney, Agent, or Firm* — Raphael Freiwirth

(57) ABSTRACT

Embodiments include managing a reverse link transmission power level setpoint during periods of data inactivity on a reverse link traffic channel in a wireless communications system. At an access terminal, upon detecting reverse link data inactivity above a time threshold, a message is generated and transmitted on the reverse link traffic channel at a power level sufficient for the access network to measure transmission statistics to determine whether to adjust the current transmission power level setpoint of the access terminal. Alternatively, the access terminal notifies the access network of an upcoming reverse link data inactivity period, and then lowers its transmission power level setpoint to reduce power consumption during the reverse link data inactivity period. Then, upon detection of a potential reverse link data transmission, the access terminal may then send one or more messages to prompt the access network to modify the access terminal's transmission power level setpoint.

57 Claims, 12 Drawing Sheets

(51) Int. Cl.
  *H04W 52/02*    (2009.01)
  *H04W 52/14*    (2009.01)
  *H04W 52/24*    (2009.01)
  *H04W 52/44*    (2009.01)

(52) U.S. Cl.
  CPC .......... *H04W52/143* (2013.01); *H04W 52/248* (2013.01); *H04W 52/0232* (2013.01); *H04W 52/241* (2013.01); *H04W 52/44* (2013.01); *Y02B 60/50* (2013.01)

(56) References Cited

U.S. PATENT DOCUMENTS

| | | | |
|---|---|---|---|
| 6,252,865 B1* | 6/2001 | Walton et al. | 370/335 |
| 6,285,665 B1* | 9/2001 | Chuah | 370/319 |
| 6,724,740 B1* | 4/2004 | Choi et al. | 370/335 |
| 6,754,506 B2* | 6/2004 | Chang et al. | 455/522 |
| 6,829,468 B2* | 12/2004 | Gandhi et al. | 455/69 |
| 6,831,910 B1* | 12/2004 | Moon et al. | 370/342 |
| 6,876,866 B1* | 4/2005 | Ulupinar et al. | 455/522 |
| 7,768,953 B2* | 8/2010 | Terry et al. | 370/311 |
| 7,936,690 B2* | 5/2011 | Willenegger | 370/252 |
| 8,014,730 B2* | 9/2011 | Moulsley et al. | 455/522 |
| 8,072,915 B1* | 12/2011 | Gutierrez et al. | 370/318 |
| 8,116,801 B2* | 2/2012 | Lee et al. | 455/522 |
| 8,195,216 B2* | 6/2012 | Baker et al. | 455/522 |
| 2001/0040880 A1* | 11/2001 | Chen et al. | 370/337 |
| 2002/0019245 A1* | 2/2002 | Longoni et al. | 455/522 |
| 2003/0123401 A1* | 7/2003 | Dean | 370/318 |
| 2003/0189951 A1 | 10/2003 | Bi et al. | |
| 2007/0030829 A1 | 2/2007 | Vimpari et al. | |

FOREIGN PATENT DOCUMENTS

| | | |
|---|---|---|
| JP | 2004535114 A | 11/2004 |
| JP | 2005518113 A | 6/2005 |
| WO | 02101941 A2 | 12/2002 |
| WO | WO03058829 * | 1/2003 |
| WO | 2008101053 A2 | 8/2008 |
| WO | WO2008101055 | 8/2008 |

OTHER PUBLICATIONS

International Search Report and Written Opinion—PCT/US2010/030188, International Search Authority—European Patent Office—Nov. 22, 2010

Philips: "Power Control Issues for Gated DPCCH" 3GPP Draft; RI-00-0691, 3rd Generation Partnership Project (3GPP), Mobile Competence Centre ; 650, Route Des Lucioles ; F-06921 Sophia-Antipolis Cedex ; France, vol. RAN WGI, no. Tokyo; 20000529, May 29, 2000, XP050092518.

Siemens: "Proposal on how to realize Continuous Connectivity for Packet Data Users", TSG-RAN Working Group 1 Meeting #42 Tdoc R1-050821, Aug. 29, 2005, p. 1-p. 6.

* cited by examiner

MANAGING A REVERSE LINK TRANSMISSION POWER LEVEL SETPOINT DURING PERIODS OF INACTIVITY ON THE REVERSE LINK IN A WIRELESS COMMUNICATIONS SYSTEM

CLAIM OF PRIORITY UNDER 35 U.S.C. §119

The present application for patent claims priority to Provisional Application No. 61/167,707 entitled "MANAGING A REVERSE LINK TRANSMISSION POWER LEVEL SETPOINT DURING PERIODS OF INACTIVITY ON THE REVERSE LINK IN A WIRELESS COMMUNICATIONS SYSTEM" filed Apr. 8, 2009, and assigned to the assignee hereof and hereby expressly incorporated by reference herein.

BACKGROUND OF THE INVENTION

1. Field of the Invention

Embodiments of the present invention are managing a reverse link transmission power level setpoint during periods of inactivity on the reverse link in a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments include managing a reverse link transmission power level setpoint during periods of data inactivity on a reverse link traffic channel in a wireless communications system. At an access terminal, upon detecting reverse link data inactivity above a time threshold, a message is generated and transmitted on the reverse link traffic channel at a power level sufficient for the access network to measure transmission statistics to determine whether to adjust the current transmission power level setpoint of the access terminal. Alternatively, the access terminal notifies the access network of an upcoming reverse link data inactivity period, and then lowers its transmission power level setpoint to reduce power consumption during the reverse link data inactivity period. Then, upon detection of a potential reverse link data transmission, the access terminal may then send one or more messages to prompt the access network to modify the access terminal's transmission power level setpoint.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
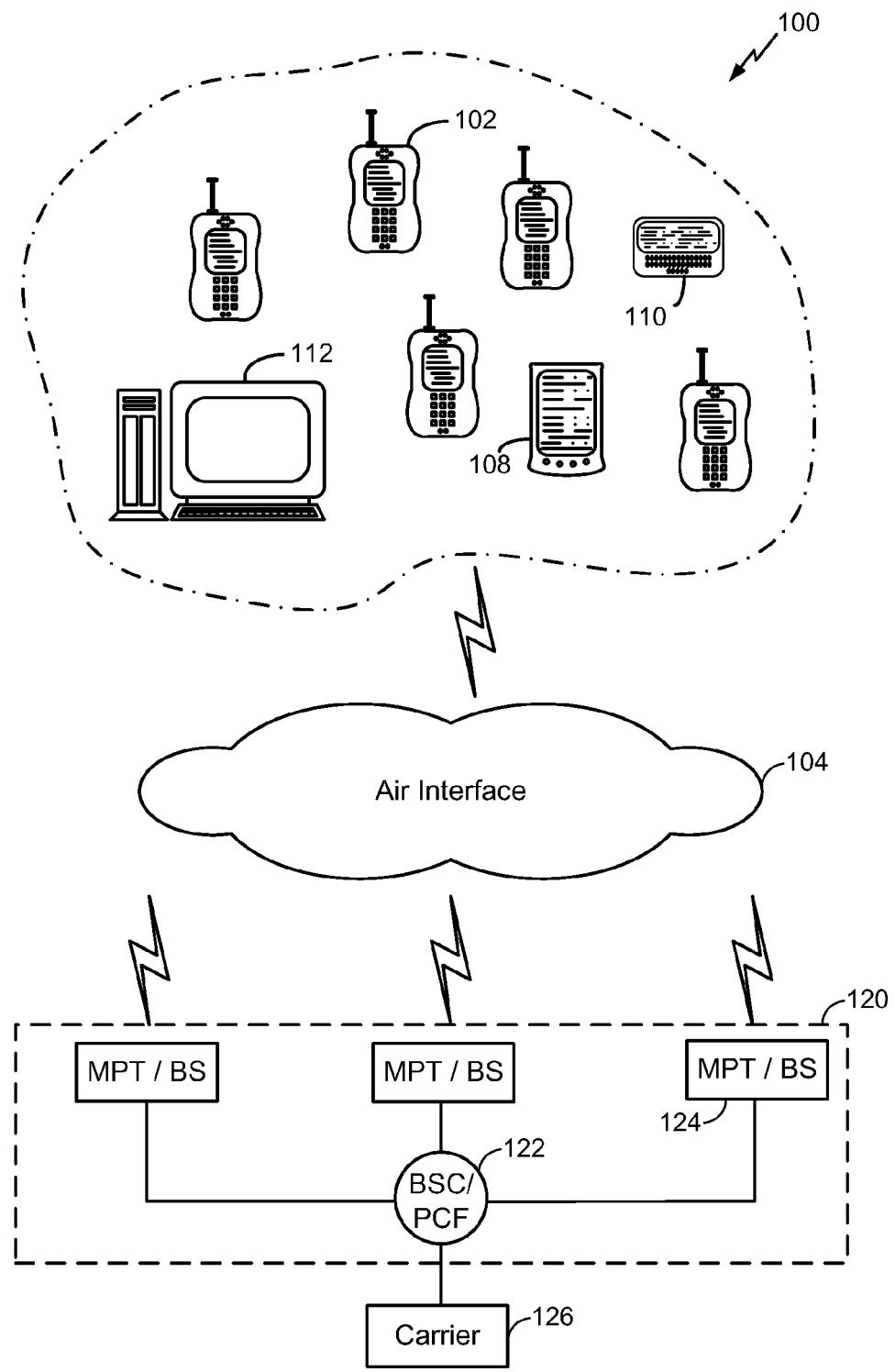
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 160 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
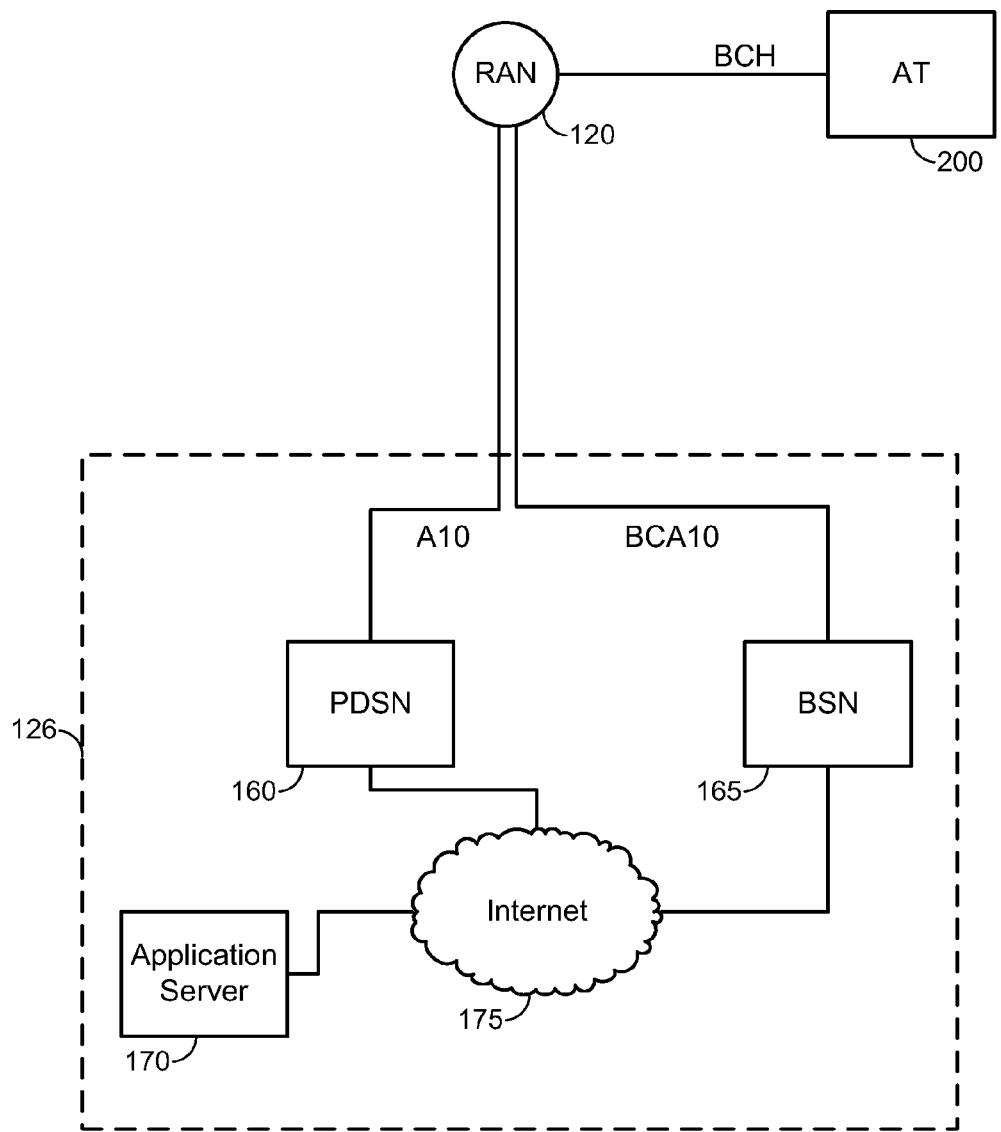
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
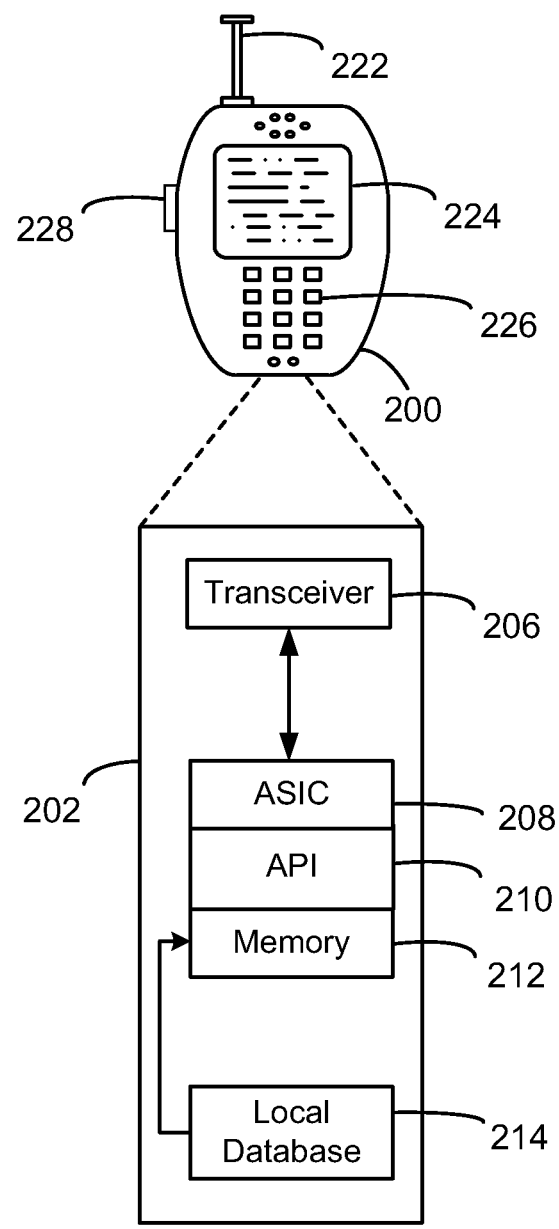
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4A:
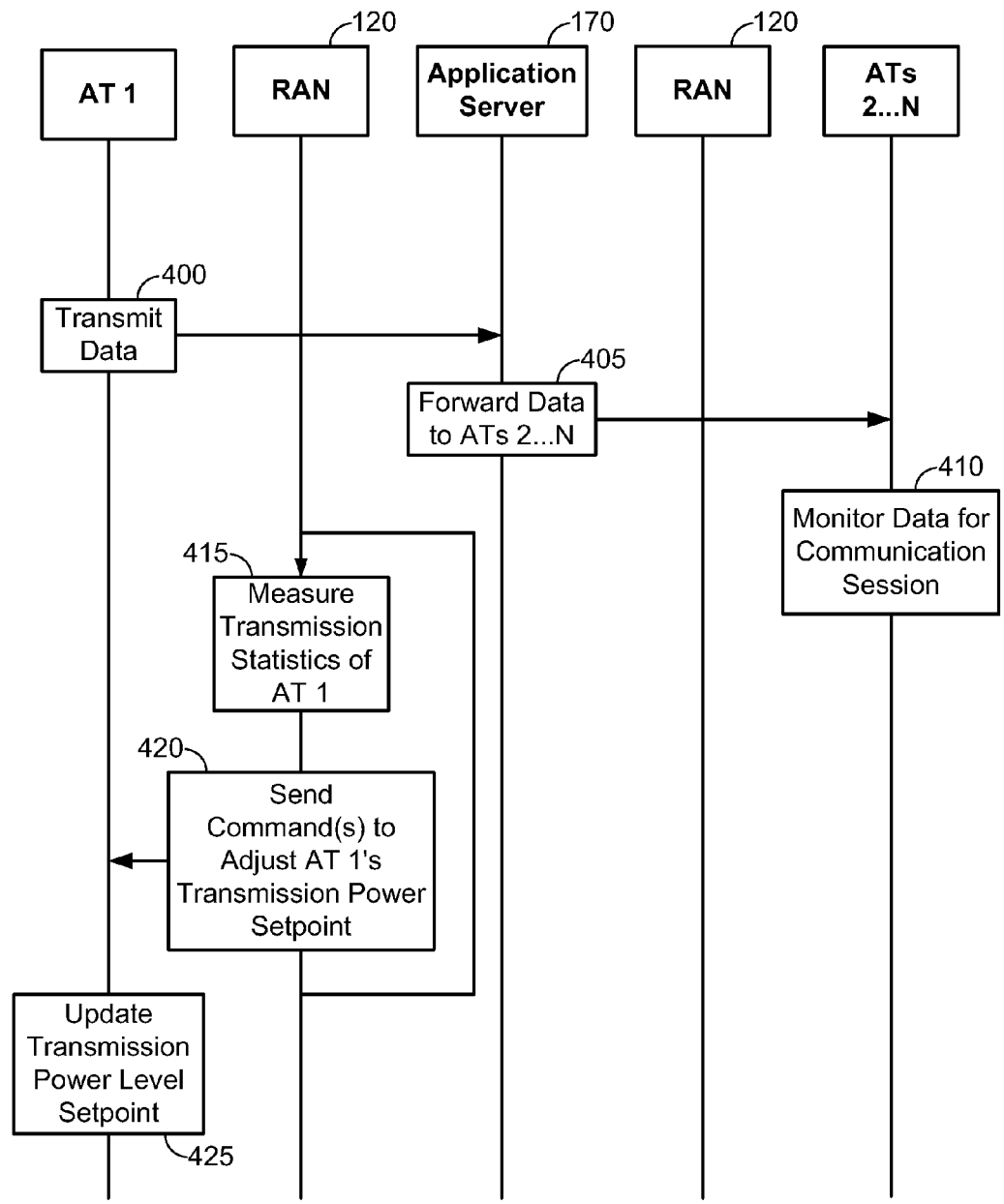
FIG. 4A illustrates a conventional manner of managing a reverse link transmission power level setpoint for a current floor-holder of a communication session.

FIG. 4A illustrates a conventional manner of managing a reverse link transmission power level for a current floor-holder of a communication session. Referring to FIG. 4A, in 400, the current floor-holder ("AT 1") transmits data on a reverse link to the RAN 120, which forwards the data to the application server 170. As will be appreciated by one of ordinary skill in the art, AT 1's data transmission(s) of 400 are transmitted on a reverse link channel at a transmission power level corresponding to a current transmission power level setpoint for AT 1. The transmission power level setpoint corresponds to a target transmission power level for AT 1 which can change over time based on transmission statistics for AT 1 as measured at the RAN 120 (e.g., and also possibly sector-conditions, such as overall interference in the sector for a CDMA or other interference-limited system), as will be described below in greater detail. The transmission power level setpoint can either correspond to an actual transmission power level for data transmissions from AT 1, or alternatively can correspond to a value that is offset by a given factor to arrive at AT 1's actual transmission level for data transmissions. For example, the transmission power level setpoint can be used to determine a first transmission power level for non-data pilot signals, and a second transmission power level for data transmissions.

In an example, AT 1 may be a current floor-holder (e.g., call initiator) for a push-to-talk (PTT) session. The application server 170 forwards the data from AT 1 to one or more ATs 2 . . . N that have registered to the call (e.g., a group call, such as a PTT session) or transport session with AT 1, 405. For example, N is greater than 2 in a group call, and is equal to 2 in a unicast call (e.g., a call only between AT 1 and AT 2). Thus, in 405, the application server 170 forwards the data to the RAN 120, which transmits the data in one or more sectors to ATs 2 . . . N. ATs 2 . . . N monitor the data transmitted by the RAN 120 for the communication session, 410.

During the communication session, the outer-loop power control algorithm at the RAN 120 measures transmission statistics of the data transmissions of AT 1 from 400, as well as any other packet transmissions from AT 1, 415. For example, the RAN 120 can measure a packet error rate (PER) of AT 1's transmissions over a given time interval (e.g., 1 second) or apply moving averaging or other time-series algorithms. In another example, the RAN 120 can also measure a signal-to-noise ratio (SINR) of AT 1's transmissions as received at the RAN 120 over another given time interval (e.g., 3 or more seconds). Other transmission statistics, such as power-loss, can also be measured. The inner loop power control works at a fast rate. For example, the BSC at the RAN 120 sets a target SINR that the AT should achieve. If the AT's SINR at the BTS is lower than the target SINR, the RAN 120 instructs the BSC to increase its transmit power. If the AT's SINR at the BTS is higher than the target SINR, the RAN 120 instructs the BSC to decrease its transmit power. The outer-loop power control works at a slower rate and is based on the link conditions. In order to determine the target SINR for a given AT, the BSC measures the PER experienced by the AT over the duration of the call. If the PER is lower than the target PER for the AT (or RLP flow), the BSC will lower the target SINR. If the PER is higher than the target PER for the AT (or RLP flow), the BSC will increase the target SINR. At the initialization of the connection, it is typical for the network to assume a conservative (i.e., higher than average) SINR as the RAN 120 has not been able to track the AT's channel conditions. However, after the connection is established, the AT's target SINR will converge to a value that ensures that the target PER is met.

Based on the measured transmission statistics for AT 1 in 415, the RAN 120 determines whether to command AT 1 to increase or decrease its transmission power level, and transmits an appropriate power level adjustment message, 420. The determination as to whether to increase or decrease AT 1's transmission power level setpoint in 420 can be based on a number of factors. For example, one or more of AT 1's transmission statistics can be used to determine whether to adjust AT 1's transmission power level. For a given AT, the measured transmission statistic can be flow-specific or AT-specific. In case the measured transmission statistic is flow specific, the statistic can be either on a per IP flow, RLP flow or a MAC flow basis. As delay sensitive flows such as VoIP flows may require a more stringent PER requirement, the outer-loop power control can establish the setpoint by taking into consideration the target PER for the associated flow when power controlling ATs. As will be appreciated by one of ordinary skill in the art, if the measured transmission statistic is flow-specific, in an example, the corresponding power level adjustment message in 420 is configured to adjust a setpoint for that specific flow only, and not necessarily other flows carried by AT 1.

In an example, assume that a target PER for AT 1 is 5%. In this example, if the measurement of 415 indicates that AT 1's PER is less than 5% by a threshold amount, then the RAN 120 determines to command AT 1 to decrease its transmission power level setpoint. In an alternative example, if the measurement of 415 indicates that AT 1's PER is greater than 5% by a threshold amount, then the RAN 120 determines to command AT 1 to increase its transmission power level setpoint. It will be appreciated that different types of applications can be associated with different target PERs. For example, a phone call can have a relatively low target PER because packet losses result in a degradation in call quality. In another example, a data transport session can have a relatively high target PER because an average packet transfer rate has a higher priority than maintaining a high-quality connection at all times throughout the session. The target PER can be used in conjunction with other parameters in the determination of 420. For example, if the PER of all ATs in AT 1's sector is measured at high levels, the problem may be that the combined transmission of all the ATs in AT 1's sector is causing too much interference. In this case, AT 1 may be commanded to lower its transmission power level setpoint despite its PER being above the target PER. In any case, the determination of 420 depends upon AT 1's having sent recent data transmissions from which the transmission statistics can be measured.

Returning to FIG. 4A, if the RAN 120 determines increase AT 1's transmission power level setpoint, the RAN 120 transmits one or more power level adjustment messages to AT 1 having a power control bit (PCB) set to instruct AT 1 to increase its transmission power level setpoint, and the process then returns to 415 and the RAN 120 continues to monitor AT 1's transmission statistics. Otherwise, if the RAN 120 determines to adjust AT 1's transmission power level setpoint, the RAN 120 transmits one or more power level adjustment messages to AT 1 having a power control bit (PCB) set to instruct AT 1 to either decrease its transmission power level setpoint, and the process then returns to 415 and the RAN 120 continues to monitor AT 1's transmission statistics. In FIG. 4A, 415 and 420 may repeat at a relatively quick pace. For example, approximately fifty (50) power level adjustment messages can be transmitted per second based on an on-going time-averaged PER. In other examples, if the RAN 120 operates in accordance with EV-DO Rev. A protocols, then 150 power level adjustment messages may be sent per second, and if the RAN 120 operates in accordance with Rel. 0, then 600 power level adjustment messages may be sent per second. In a further example, the PCB can be a single-bit indicator that is set to a first logic level (e.g., "1") to instruct AT 1 to increase its transmission power level by a fixed amount, and a second logic level (e.g., "0") to instruct AT 1 to decrease its transmission power level by the fixed amount. Upon receiving the power level adjustment message, AT 1 updates (e.g., decreases or increases) its transmission power level setpoint by a given amount or step-size based on the logic level of the PCB.

As will be appreciated by one of ordinary skill in the art, FIG. 4A illustrates an example of reverse link outer-loop power control (ROLPC). The reverse link transmission power is controlled based at least in part on the transmission statistics as measured by the RAN 120. However, it is more difficult to maintain an AT's transmission power level setpoint at an appropriate level when the AT is not actively transmitting data, because recent transmission statistics are not available. For example, if the communication session in FIG. 4A is a unicast group session (e.g., a group call supported by IP unicasting instead of IP multicasting) where AT 1 is the current floor-holder and ATs 2 . . . N are target ATs, the target ATs monitor the session but do not necessarily transmit data (e.g., at least for the group session, although one or more of ATs 2 . . . N may transmit data related to other applications). Thus, if ATs 2 . . . N are not transmitting data over a traffic channel (TCH) for a given period of time (referred to as a "data inactivity period" or "reverse link data transmission inactivity period" over the TCH, in this case), then the RAN 120 cannot measure transmission statistics for ATs 2 . . . N (i.e., because no data transmissions are present from ATs 2 . . . N). If one or more of ATs 2 . . . N moves to a different location during the data inactivity period, or the channel conditions for ATs 2 . . . N change for some other reason, the transmission power level setpoint for the one or more ATs before the data inactivity period may be either too high or too low at a next point in time when the one or more ATs wishes to begin transmitting data. The difference between an AT's actual transmission power level setpoint and the AT's ideal transmission power level setpoint that occurs during the data inactivity period can be referred to as transmission power level setpoint drift. Based on simulation results, it has been observed that avoiding the setpoint drift problem can lower the Ec,p/Nt, thereby reducing significant amount of signal interference and increasing network capacity.

ATs that have a traffic channel (TCH) continue to transmit pilot signals, which are not data transmissions, on a reverse link pilot channel during reverse link data inactivity periods. At a given interval, each AT transmits a pilot signal, which has a transmission power level that is offset by a given factor from a transmission power level at which data is transmitted. Generally, the transmission power level for the pilot signal is lower than the transmission power level for data. The pilot signal, however, is not sufficient for the RAN 120 to measure transmission statistics that are useable for adjusting the AT's transmission power level setpoint during the data transmission inactivity period. Thus, the pilot signal alone is insufficient to avoid the problem of transmission power level setpoint drift. Also, if the transmission power level setpoint is increased during the period of data transmission inactivity, an overly strong pilot signal is transmitted from one or more ATs, which can unnecessarily consume power at the one or more ATs and increase signal interference.

Figure 4B:
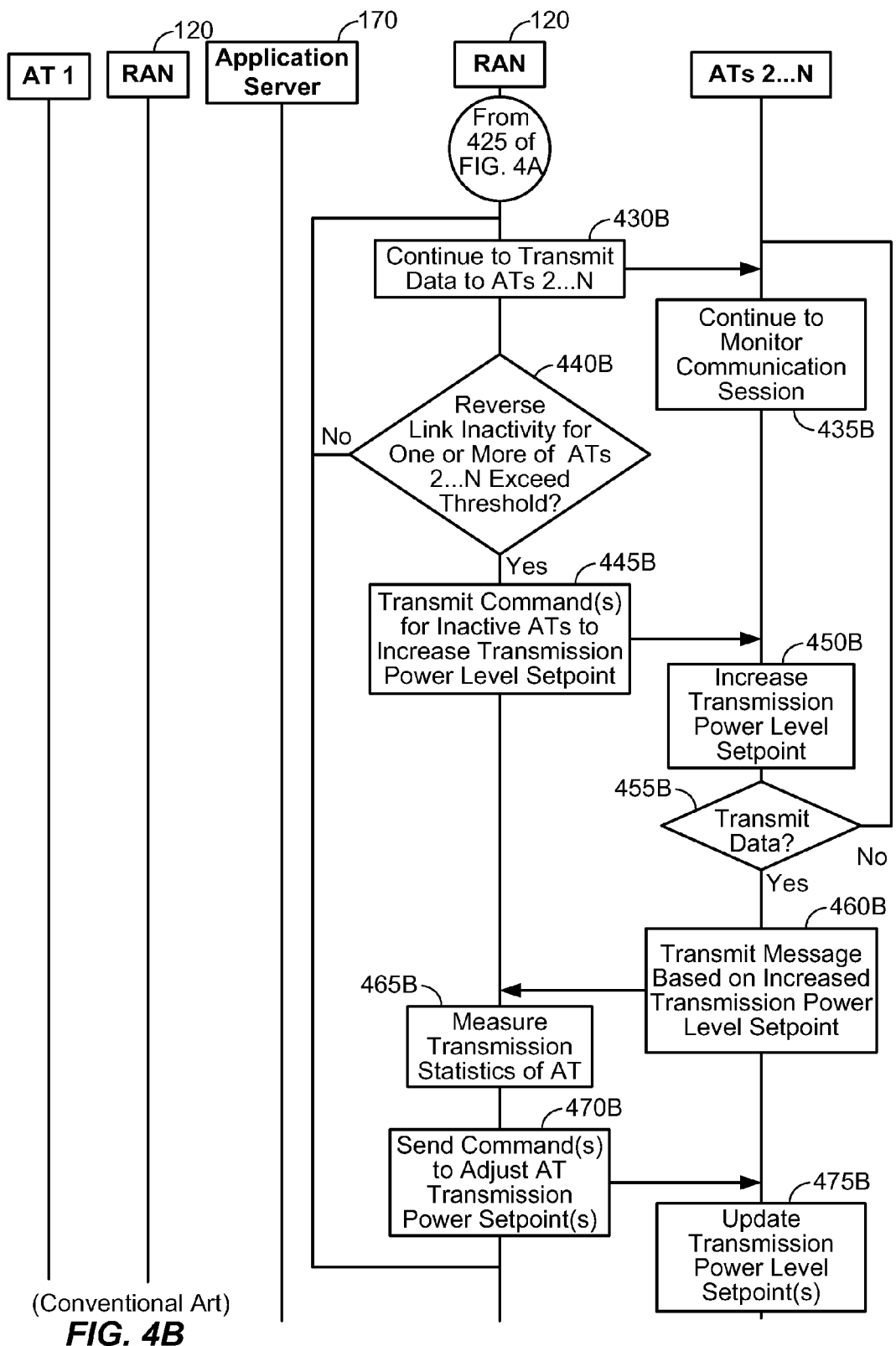
FIG. 4B illustrates a conventional manner of managing a reverse link transmission power level setpoint for one or more access terminals participating in a communication session during a data inactivity period.

FIG. 4B illustrates a conventional manner of managing a reverse link transmission power level setpoint for one or more access terminals participating in a communication session during a data inactivity period. The FIG. 4B illustrates a continuation of the process of FIG. 4A.

Referring to FIG. 4B, after 425 of FIG. 4A, assume that the communication session continues and the RAN 120 continues to transmit data to ATs 2 . . . N for the communication session (e.g., which is forwarded from the application server 170 from a current floor-holder), 430B. For convenience of explanation, assume that AT 1 remains the floor-holder throughout the process of FIG. 4B. ATs 2 . . . N continue to monitor the data transmitted by the RAN 120 for the communication session, 435B.

In 440B, the RAN 120 determines whether a period of reverse link inactivity ("data inactivity period" or "reverse link data transmission inactivity period") for one or more of ATs 2 . . . N exceeds a threshold. For example, if AT 2 is not engaged in any other communication sessions with the RAN 120 such that AT 2 has ceased all data transmissions while monitoring the communication session (e.g., although AT 2 still sends a periodic pilot signal), then AT 2's data inactivity period may exceed the threshold after a given amount of time. If the RAN 120 determines that the data inactivity period for ATs 2 . . . N does not exceed the threshold, the process returns to 430B and the RAN 120 continues to transmit data to AT s 2 . . . N for the communication session. Otherwise, if the RAN 120 determines that the data inactivity period for at least one of ATs 2 . . . N exceeds the threshold, then the RAN 120 transmits one or more power level adjustment messages, 445B, to each inactive AT among ATs 2 . . . N that has a PCB set to instruct the inactive AT(s) to increase their reverse link transmission power level setpoint. Each time the RAN 120 transmits a power level adjustment message to any of ATs 2 . . . N, the AT(s) among ATs 2 . . . N receiving the power level adjustment message adjusts their transmission power level setpoint accordingly, 450B. It will be appreciated that unlike the power level adjustment message from 420 of FIG. 4A, the power level adjustment message transmitted by the RAN 120 in FIG. 445B is transmitted in response to reverse link data inactivity by ATs 2 . . . N, and not in response to measured transmission statistics. Thus, the power level adjustment message in 445B does not necessarily result in a convergence of transmission power level setpoint(s) at ATs 2 ... N to an appropriate level.

While not explicitly shown in FIG. 4B, steps 440B and 445B can repeat a number of times if the data inactivity period for one or more of ATs 2 ... N is sufficiently long, with a timer at the RAN 120 being reset each time the data inactivity period exceeds the threshold until a next time at which the timer again exceeds the threshold without reverse link data transmission activity from one or more of ATs 2 ... N, and so on. Thus, if AT 2 is inactive for a very long period of time while monitoring the communication session, for example, AT 2's transmission power level setpoint can be maxed out (e.g., augmented to a level from which further increases are not possible), such that AT 2 transmits at a highest possible transmission power level the next time AT 2 wishes to transmit a reverse link data message to the RAN 120.

Accordingly, assume that each of ATs 2 ... N are silent or inactive for a long period of time (e.g., because AT 1 has remained the floor-holder for a long period of time), that the RAN 120 has been unable to measure transmission statistics for ATs 2 ... N, and that the RAN 120 transmitted a number of power level adjustment messages to each of ATs 2 ... N at least until each of ATs 2 ... N has maxed out their respective reverse-link transmission power level setpoints (e.g., which are used to establish transmission power levels for both data transmissions and the pilot signal). While not shown explicitly within FIG. 4B, this means that AT 1 is transmitted its reverse link pilot signals at a relatively high transmission power level, which consumes power at AT 1 and increases interference in AT 1's sector. Next, assume that each of ATs 2 ... N determine whether to begin transmitting data in 455B. If ATs 2 ... N determine not to transmit data in 455B, the process returns to 435B and ATs 2 ... N continue to monitor the communication session. Otherwise, if one or more of ATs 2 ... N determine to transmit data in 455B (e.g., a floor request for the communication session, where many of ATs 2 ... N request the floor at approximately the same time), then each of ATs 2 ... N that have determined to transmit transmits a message, 460B, at a transmission power level corresponding to its current transmission power level setpoint. As noted above, it is assumed in this example that each of ATs 2 ... N has maxed out their transmission power level setpoints (e.g., for the pilot signal, which is also used to determine the transmission power level for data transmissions) due to the long data inactivity period. Thus, each of ATs 2 ... N that have determined to transmit in 455B transmits the data message in 460B at a relatively high (e.g., highest possible) transmission power level for data from the respective ATs.

As will be appreciated, the data message transmission of 460B ends the data inactivity period for the transmitting ATs. Accordingly, in 465B, the RAN 120 measures transmission statistics (e.g., PER, SINR, etc.) for each AT that transmitted in 460B, and transmits a power level adjustment message to the transmitting ATs, 470B. After the RAN 120 determines to adjust the transmission power level setpoint of at least one of the transmitting ATs, one or more power level adjustment messages are sent to the selected ATs in 470B before the process returns 430B. The one or more ATs then adjust their transmission power level setpoints based on the received power level adjustment message(s), 475B.

As will be appreciated by one of ordinary skill in the art, if a high number of ATs transmit at the same time in a given sector at a very high transmission power level, interference in the given sector can increase dramatically. Thus, for example, assume that the communication session in FIG. 4B is a group session, and AT 1 releases the floor. Each of ATs 2 ... N receive the floor-release message and, potentially, each of ATs 2 ... N can determine to transmit at the same time to request the floor. Thus, a high number of ATs, in this case, would be transmitting at a very high transmission power level (e.g., if the data inactivity period was relatively long, prompting one or more increases to transmission power level setpoints of the ATs) and at substantially the same time. If many of these ATs are co-located in the same sector, then system performance in that sector can degrade significantly. Also, it will be appreciated that even if only a few ATs transmit at a transmission power level that is higher than necessary, system performance in one or more sectors can degrade to a lesser degree. Also, during the data transmission inactivity period, if ATs are instructed over time to max out their transmission power level setpoints, the ATs can transmit their respective pilot signals on the reverse link at very high levels, which can both consume a high amount of power at the ATs and also increase interference in one or more sectors.

In order to mitigate the high-powered transmission scenarios discussed above, another conventional reverse link power control process as described below with respect to FIG. 4C can be implemented. As will be described with respect to FIG. 4C, the RAN 120 refrains from sending any power level adjustment messages to ATs 2 ... N irrespective of the length of their respective data inactivity periods.

Figure 4C:
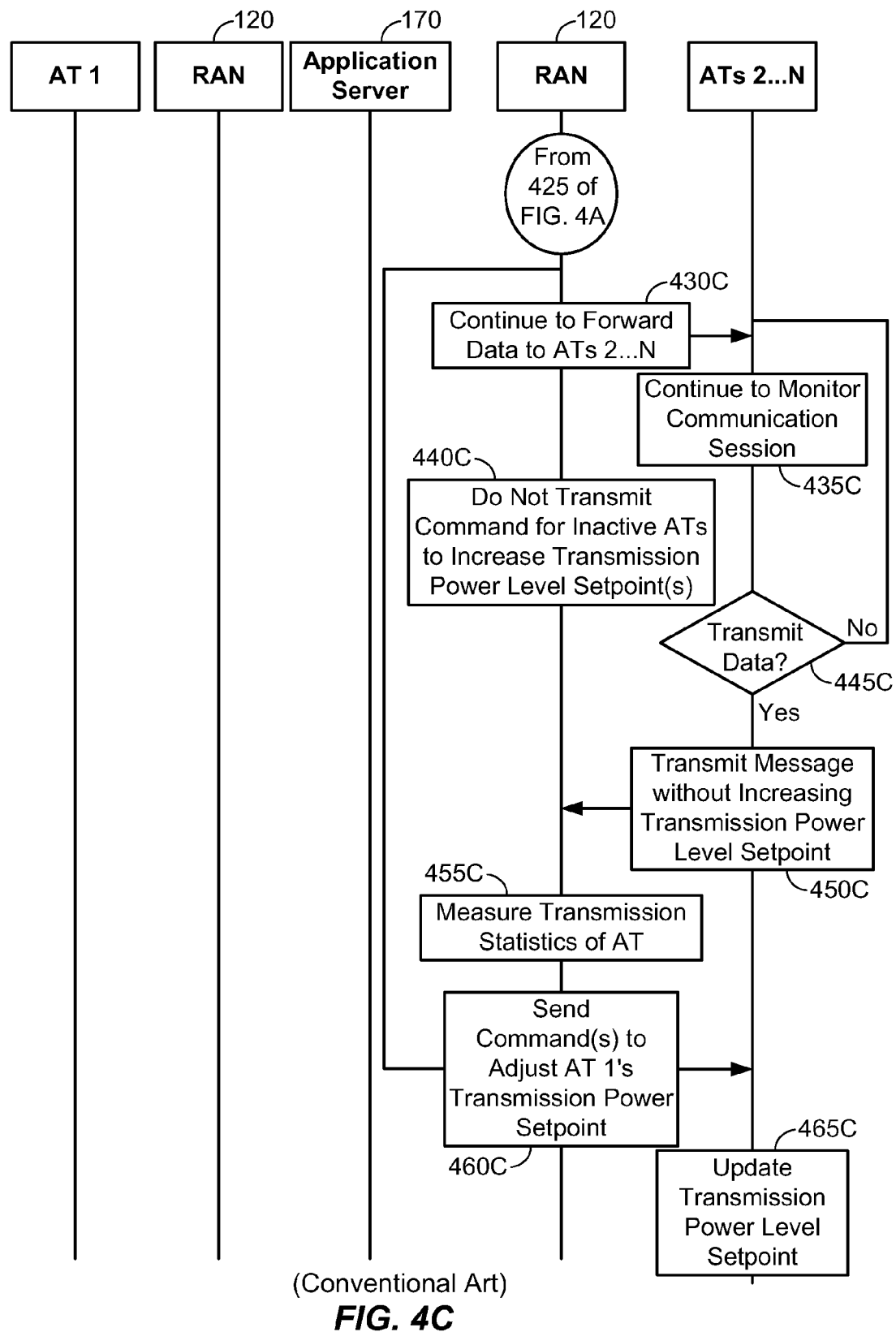
FIG. 4C illustrates another conventional manner of managing a reverse link transmission power level setpoint for one or more access terminals participating in a communication session during a data inactivity period.

Referring to FIG. 4C, after 425 of FIG. 4A, assume that the communication session continues and the RAN 120 continues to transmit data to ATs 2 ... N for the communication session (e.g., which is forwarded from the application server 170 from a current floor-holder), 430C. For convenience of explanation, assume that AT 1 remains the floor-holder throughout the process of FIG. 4C. ATs 2 ... N continue to monitor the data transmitted by the RAN 120 for the communication session, 435C.

In 440C, unlike FIG. 4B, the RAN 120 does not send any power level adjustment messages to ATs 2 ... N during their respective data inactivity periods. Next, assume that each of ATs 2 ... N are silent or inactive for a long period of time (e.g., because AT 1 has remained the floor-holder for a long period of time), such that the RAN 120 has been unable to measure transmission statistics for ATs 2 ... N and has also not transmitted any power level adjustment messages to each of ATs 2 ... N. Next, assume that each of ATs 2 ... N determine whether to begin transmitting data in 445C. If ATs 2 ... N determine not to transmit data in 445C, the process returns to 435C and ATs 2 ... N continue to monitor the communication session. Otherwise, if one or more of ATs 2 ... N determine to transmit data in 445C, then each of ATs 2 ... N that have determined to transmit transmits a message, 450C, at a transmission power level corresponding to the ATs' current transmission power level setpoint(s), which in FIG. 4B are established prior to the data inactivity period.

The message transmission of 450C ends the data inactivity period for the transmitting ATs. Accordingly, in 455C, the RAN 120 measures transmission statistics (e.g., PER, SINR, etc.) for each AT that transmitted in 450C, determines to increase or decrease the transmission power level setpoint of at least one of the transmitting ATs, and transmits one or more power level adjustment messages are to the ATs in 460C before the process returns 430C. One or more ATs then adjust their transmission power level setpoints based on the received power level adjustment message(s), 465C.

It will be appreciated that the channel conditions for ATs 2 ... N may change substantially during their respective data inactivity periods. For example, one or more of ATs 2 ... N may move closer to a serving base station, which decreases their ideal or appropriate transmission power level setpoint (e.g., for maintaining a target PER), while one or more other of ATs 2 . . . N may move further away from a serving base station or into a high-interference area, which increases their ideal or appropriate transmission power level setpoint. Irrespective of these changes, ATs 2 . . . N transmit at an 'older' (i.e., less current, due to the data inactivity period) transmission power level in 450C. Thus, some ATs may be transmitting data at too high of a transmission power level in 450C, which increases interference and requires correction, while other ATs may be transmitting data at too low of a transmission power level in 450C, which decreases the transmission success rate of those ATs. Thus, while the problem of transmitting an unnecessarily high pilot signal during the data inactivity period in FIG. 4C is mitigated with respect to FIG. 4B (i.e., because the transmission power level setpoint is not simply maxed out during a long period of data inactivity in FIG. 4C), an eventual data transmission after the data inactivity period, 450C, is not necessarily transmitted at an appropriate transmission power level.

Accordingly, it will be appreciated that neither the process of FIG. 4B (i.e., gradually increasing transmission power level setpoints for inactive ATs) nor the process of FIG. 4C (i.e., refraining from adjusting transmission power level setpoints for inactive ATs until after a next transmission) can guarantee that an initial transmission after the data inactivity period approximates an appropriate level. In particular, FIG. 4B can result in transmission power level setpoints that are too high for one or more inactive ATs, and FIG. 4C can result in transmission power level setpoints that are either too high or too low for one or more inactive ATs. Embodiments of the invention, which will now be described in greater detail, are directed to managing a transmission power level setpoint for one or more inactive ATs at least prior to an initial transmission subsequent to a data inactivity period.

Figure 5A:
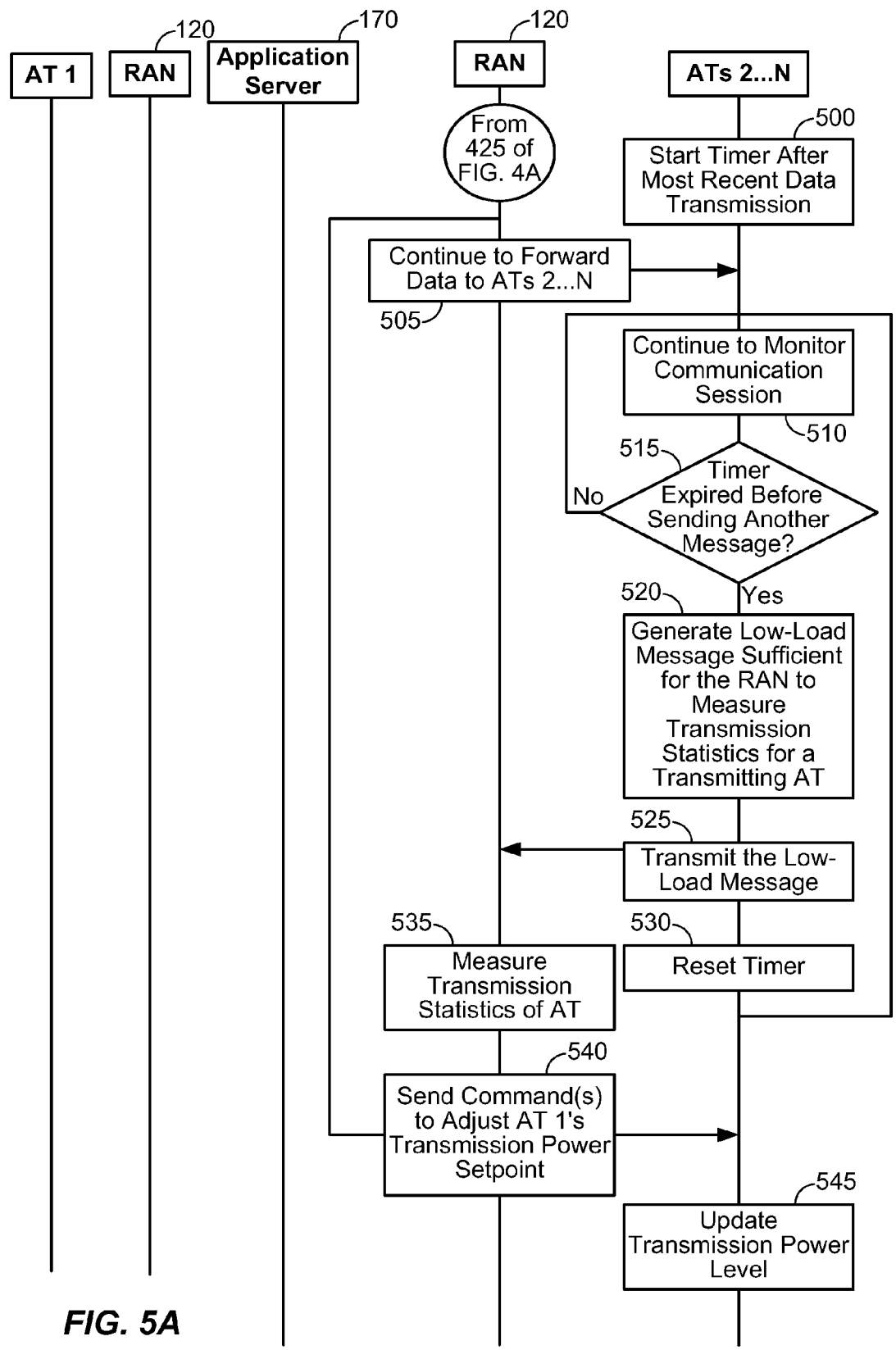
FIG. 5A illustrates a process of managing a reverse link transmission power level setpoint for one or more access terminals participating in a communication session during a reverse link data transmission inactivity period according to an embodiment of the present invention.

FIG. 5A illustrates a process of managing a reverse link transmission power level setpoint for one or more access terminals participating in a communication session during a data transmission inactivity period according to an embodiment of the present invention. Referring to FIG. 5A, assume that that the process of FIG. 4A has already executed, such that a communication session (e.g., a group or multicast session, a call, a transport session, etc.) is established between AT 1 and ATs 2 . . . N, with AT 1 as the current floor-holder for the communication session. For the sake of convenience, it will be further assumed that AT 1 remains the floor-holder throughout the process of FIG. 5A.

Referring to FIG. 5A, in 500, each of ATs 2 . . . N resets or starts a timer having a given expiration period after a most recent data or message transmission expected to be sufficient for the RAN 120 to measure transmission statistics (e.g., PER over a given period, SINR over a given period, etc.) for the respective AT. In an example, the given expiration period can be based on how far apart the RAN 120 can receive transmissions from a given AT while also maintaining relatively accurate and up-to-date AT transmission statistics (e.g., every 400 ms for EV-DO systems). Thus, the given expiration period can be based on a tradeoff between maintaining up-to-date AT transmission statistics (e.g., PER, SINR, etc.), and reducing interference in the given AT's sector by refraining from data transmission. In an example, the timer of 500 at a previous floor-holder among ATs 2 . . . N can be started or reset when the previous floor-holder releases the floor for the communication session, after which the floor is granted to AT 1. In another example, the timer of 500 can be started or reset after a last reverse link data transmission at each of ATs 2 . . . N before joining the communication session if the communication session is initiated by AT 1. As used herein, only a transmission referred to as a 'data' transmission functions to reset the timer, where data transmissions are defined as transmissions from which the RAN 120 can measure transmission statistics that are useable in a selection between whether to increase or decrease a transmission power level setpoint at the transmitting AT. Thus, a pilot signal would not qualify as a data transmission unless the pilot signal were used to adjust the transmission power level setpoint at the AT, which is not the case in most systems. Thus, the starting point of the timer is indicative of the most recent data transmission from an AT for which transmission statistics can be measured by the RAN 120.

Returning to FIG. 5A, the RAN 120 continues to transmit data to ATs 2 . . . N for the communication session (e.g., which are forwarded from the application server 170 from current floor-holder AT 1), 505, and ATs 2 . . . N continue to monitor the communication session, 510 (e.g., by tuning to a downlink BCH upon which media for the communication session is carried if the communication session is a group session supported by IP multicasting protocols, or by tuning to a downlink TCH if the communication session is a group session supported by IP unicasting protocols). Next, each of ATs 2 . . . N determines whether their timer has expired, 515. While not shown explicitly in FIG. 5, each time one or more of ATs 2 . . . N transmit a data message expected to be sufficient for the RAN 120 to measure transmission statistics for the AT, the timer is reset for the transmitting AT. Thus, an expiration of the timer, which occurs when the timer exceeds the given expiration period (e.g., which may be pre-negotiated between the RAN 120 and AT 1), implies that a given AT has been inactive in terms of data transmissions for at least an amount of time equal to the given expiration period. If the determination of 515 indicates that the timer has not expired, the process returns to 510 and the given AT continues to monitor the communication session. Otherwise, if the determination of 515 indicates that the timer has expired, ATs 2 . . . N (e.g., for the sake of convenience, this section is described as if each of ATs 2 . . . N undergo timer expiration, which is not necessarily the case) generate a low-load message sufficient for the RAN 120 to measure transmission statistics (e.g., PER, SINR, etc.), 520, and transmit the low-load message to the RAN 120, 525. For example, the low-load message may correspond to a lower-layer message that is a 'dummy' message in the sense that the RAN 120 ignores the message (e.g., does not forward the message on to another entity) and simply uses the message to compute or measure transmission statistics for ATs 2 . . . N, such as PER, such that the transmission power levels of ATs 2 . . . N can be updated if necessary. In another example, the low-load message can correspond to a relatively small application layer message (e.g., an IP data packet) that is relayed to a given endpoint (e.g., the application server 170, PDSN 160, etc.). As used herein, a low-load' data message corresponds to any message that is relatively small in length such that the transmission statistics of an AT can be measured without causing significant interference in the AT's sector. Also, the low-load message can be configured to incur a low amount of processing load at the RAN 120 (e.g., based on a flag for the RAN 120 to ignore the low-load message except for computation of transmission statistics, etc.).

As will be appreciated by one of ordinary skill in the art, while many different types of data messages, having different purposes and destinations, can be transmitted by an AT so as to result in the AT's transmission statistics being updated at the RAN 120, the low-load data message generated in 520 and transmitted in 525 is generated only in response to the expiration of the timer, which is in turn established to reduce transmission power level setpoint drift (e.g., a 'drifting' of an actual transmission power level setpoint from an ideal or appropriate transmission power level setpoint for maintaining a given success rate during data transmission inactivity at an access terminal). Thus, the message generation and transmission in 520 and 525 is distinguished from a 'keep-alive' packet, for example, where a packet is generated to keep a connection from being torn down (e.g., because ATs 2 . . . N can continue to monitor the communication session without sending keep-alive packets). This is not meant to imply that the generated message cannot correspond to a keep-alive packet, but rather that the triggering criteria for the message generation in 520 is transmission inactivity that may result in transmission power level setpoint drift, in contrast with transmission inactivity that may result in a lost connection. Likewise, the low-load data message is distinguished from a pilot signal as noted above, as the pilot signal is not used to measure transmission statistics for the AT.

After transmitting the low-load data message in 525, ATs 2 . . . N reset the timer, 530, and ATs 2 . . . N return to 510 and continue to monitor the communication session. Turning to the RAN 120, the RAN 120 receives the low load data message(s) from ATs 2 . . . N, and measures transmission statistics for ATs 2 . . . N, 535. Based on the measured transmission statistics in 535, the RAN 120 determines whether to increase or decrease the transmission power level setpoints for ATs 2 . . . N, and sends the power level adjustment message(s) to ATs 2 . . . N. After transmitting the power level adjustment message(s), the RAN 120 returns to 505 and continues to transmit data associated with the communication session to ATs 2 . . . N. In response to the power level adjustment message(s), one or more ATs among ATs 2 . . . N update their transmission power level setpoint(s) based on the power level adjustment message(s) received from the RAN 120, 545.

Figure 5B:
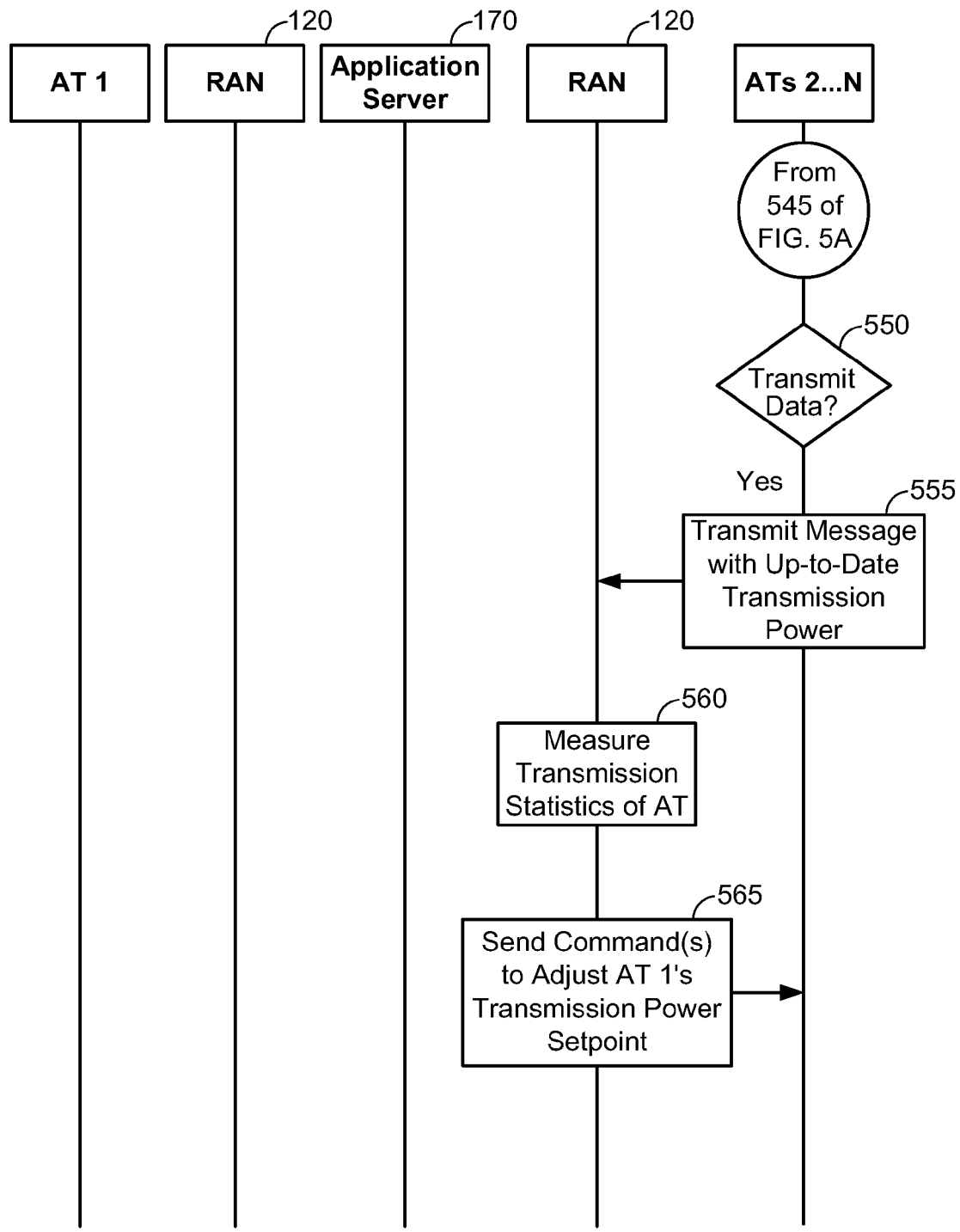
FIG. 5B illustrates a continuation of the process of FIG. 5A according to an embodiment of the present invention.

FIG. 5B illustrates a continuation of the process of FIG. 5A. Referring to FIG. 5B, ATs 2 . . . N determine whether to exit the data inactivity period (e.g., which is inactive but for the low-load data messages that maintain the transmission power level setpoints at relatively up-to-date values) and transmit data to the RAN 120, 550. For example, if a floor release message for the communication session is received at ATs 2 . . . N, one or more of ATs 2 . . . N may wish to be the next floor-holder, and thereby can determine to send a floor-request to the RAN 120 for forwarding to the application server 170 in 550. For the sake of convenience, assume that at least one of ATs 2 . . . N determines to transmit data to the RAN 120 in 550. Accordingly, in 555, the AT(s) that determine to transmit data generate one or more messages, and transmit the one or more messages to the RAN 120 at a transmission power level corresponding to the transmission power level setpoint that has been kept relatively accurate during the ATs' data inactivity period(s).

The RAN 120 receives the one or more messages from at least one of ATs 2 . . . N and measures transmission statistics for the at least one transmitting AT, 560, and sends power level adjustment message(s) for adjusting transmission power level setpoint(s) for the transmitting AT(s), 565. Because the transmission power level setpoints of ATs 2 . . . N have been kept up-to-date during the data inactivity period (e.g., instead of being allowed to drift as in FIG. 4C or increased irrespective of channel conditions as in FIG. 4B), it will be appreciated that the transmission power level from 555 is likely to be relatively close to an ideal transmission power level for matching the transmission statistic target (e.g., PER target) as determined from the measured transmission statistics from 560, and as such relatively few (e.g., or even zero) power level adjustment messages are likely to be required before ATs 2 . . . N can transmit data at an appropriate transmission power level. Thus, the initial data transmission(s) from ATs 2 . . . N can likely be sent at an appropriate transmission power level even after a relatively long data inactivity period. However, while not shown in FIG. 5B, it is appreciated that a sudden change to one or more of ATs 2 . . . N transmission environment may prompt an additional power level adjustment message in 565 despite the presence of the low-load data messages during the data inactivity period.

Accordingly, FIGS. 5A-5B collectively illustrate a process by which the transmission power level setpoints of ATs can be maintained at up-to-date levels throughout the data inactivity period. The embodiment illustrated in FIGS. 5A-5B relies upon a periodic low-load data message to be sent in the event that no other data messages are transmitted within a given threshold period of time, which is checked throughout the data inactivity period. This permits the individual ATs flexibility with regard to when data can be transmitted upon exit of a data inactivity period, because the ATs maintain appropriate transmission power level setpoints throughout the data inactivity period.

In an alternative embodiment, the ATs can rely upon advance knowledge of when data is to be transmitted, or alternatively upon conditions that indicate a relatively high probability or likelihood that data will soon need to be transmitted, such that the ATs need not send the periodic low-load data message throughout the entirety of the data inactivity period, but rather may send one or more data messages, during the data inactivity period, prior to an expected data transmission. Thus, instead of maintaining the AT's transmission power level setpoint throughout the entirety of the data inactivity period (e.g., which can potentially require many low-load data messages to be sent if the data inactivity period is long, and thereby can prompt many transmission power level adjustments), this embodiment reduces the data messaging during the data inactivity period in favor of more quickly tuning the transmission power level setpoint prior to an expected data transmission, as will now be described with respect to FIGS. 6A through 6D. In particular, FIG. 6A illustrates a high-level flowchart of the above-described process, whereas FIGS. 6B, 6C and 6D illustrate examples of the above-described process performed for the communication session established in FIG. 4A.

Figure 6A:
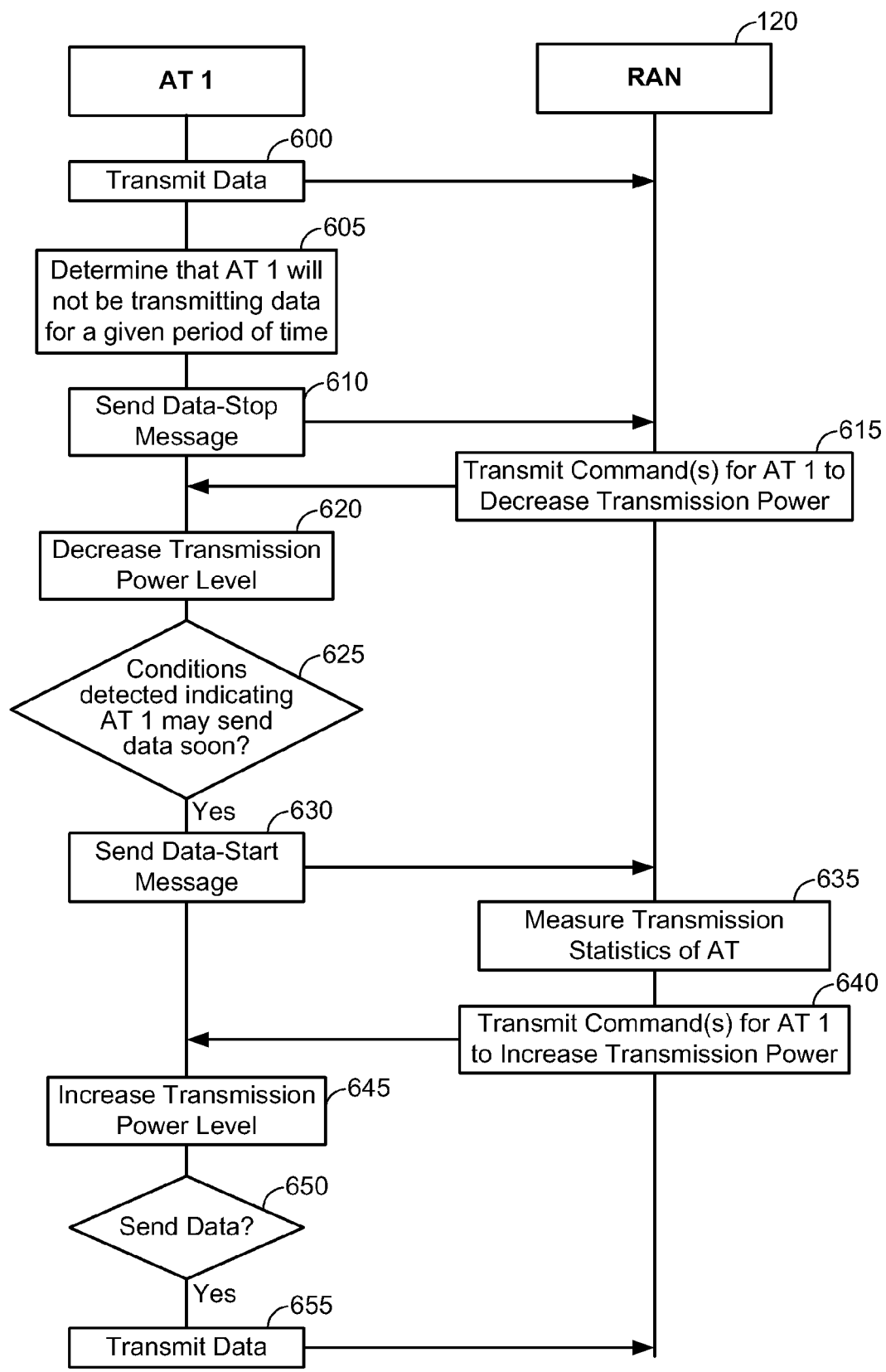
FIG. 6A illustrates another process of managing a reverse link transmission power level setpoint for one or more access terminals participating in a communication session during a reverse link data transmission inactivity period according to an embodiment of the present invention.
Figure 6B:
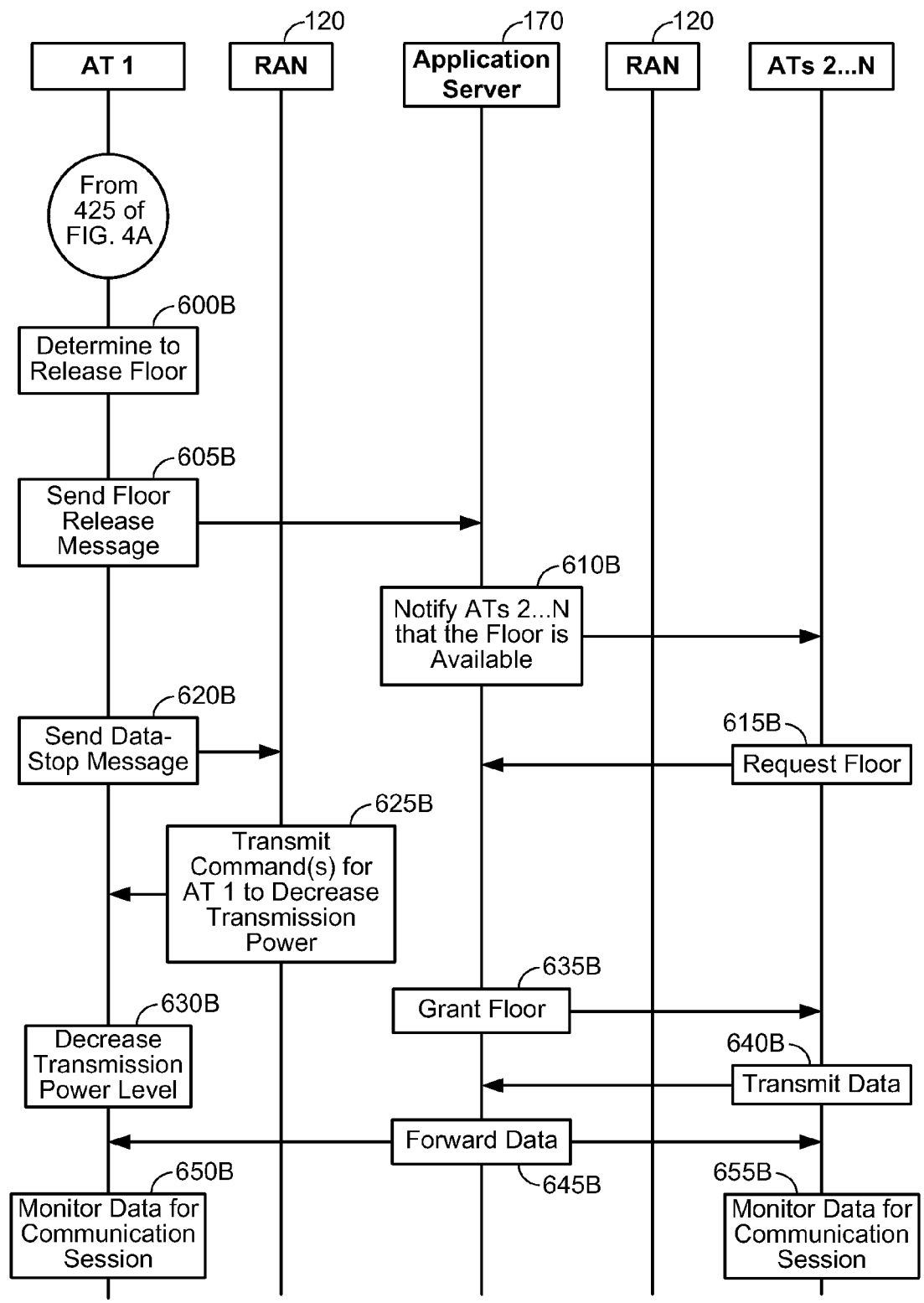
FIG. 6B illustrates a portion of the process of FIG. 6A performed with respect to the communication session established in FIG. 4A according to an embodiment of the present invention.
Figure 6C:
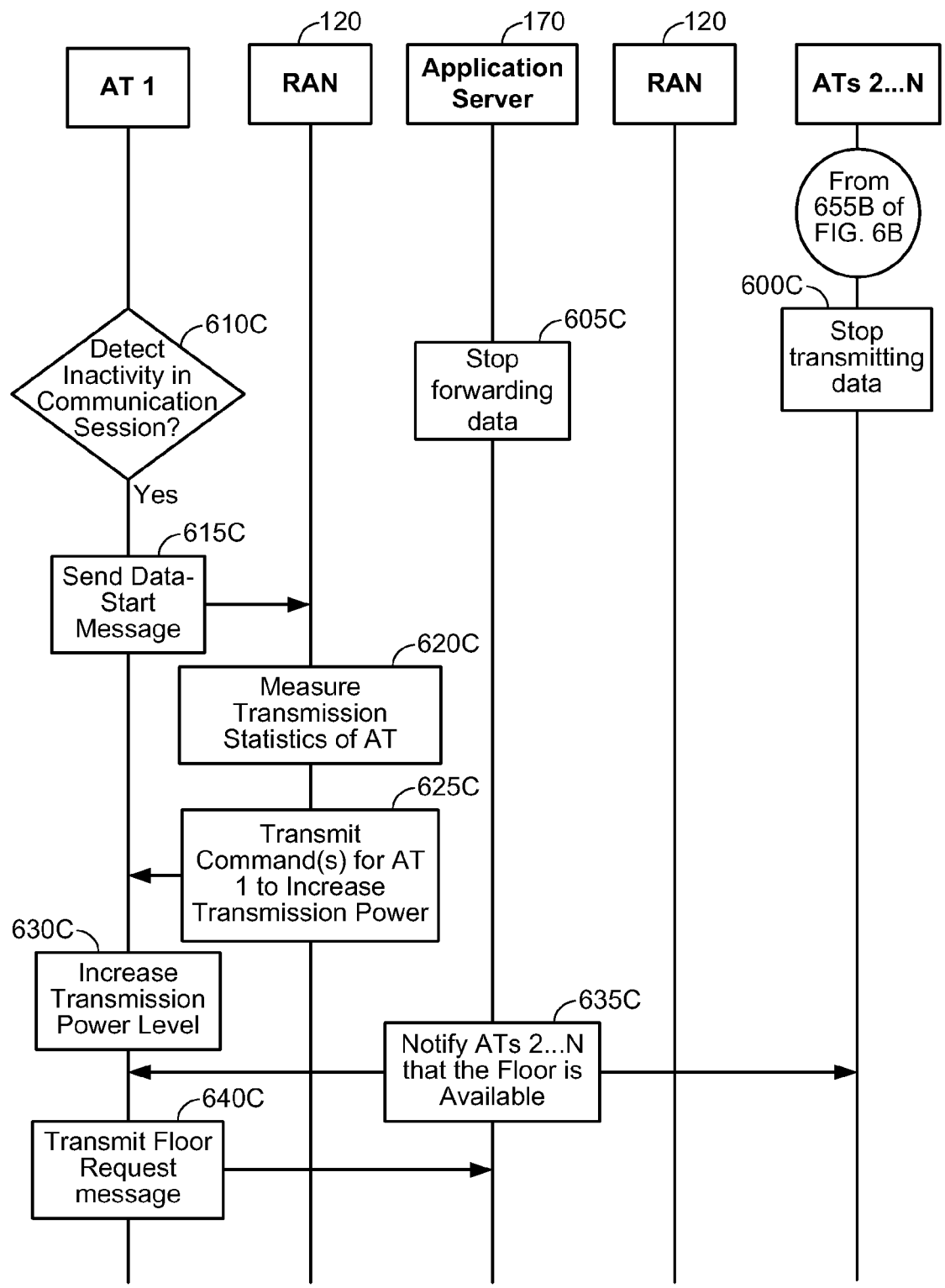
FIG. 6C illustrates a continuation of the process of FIG. 6B according to an embodiment of the present invention.
Figure 6D:
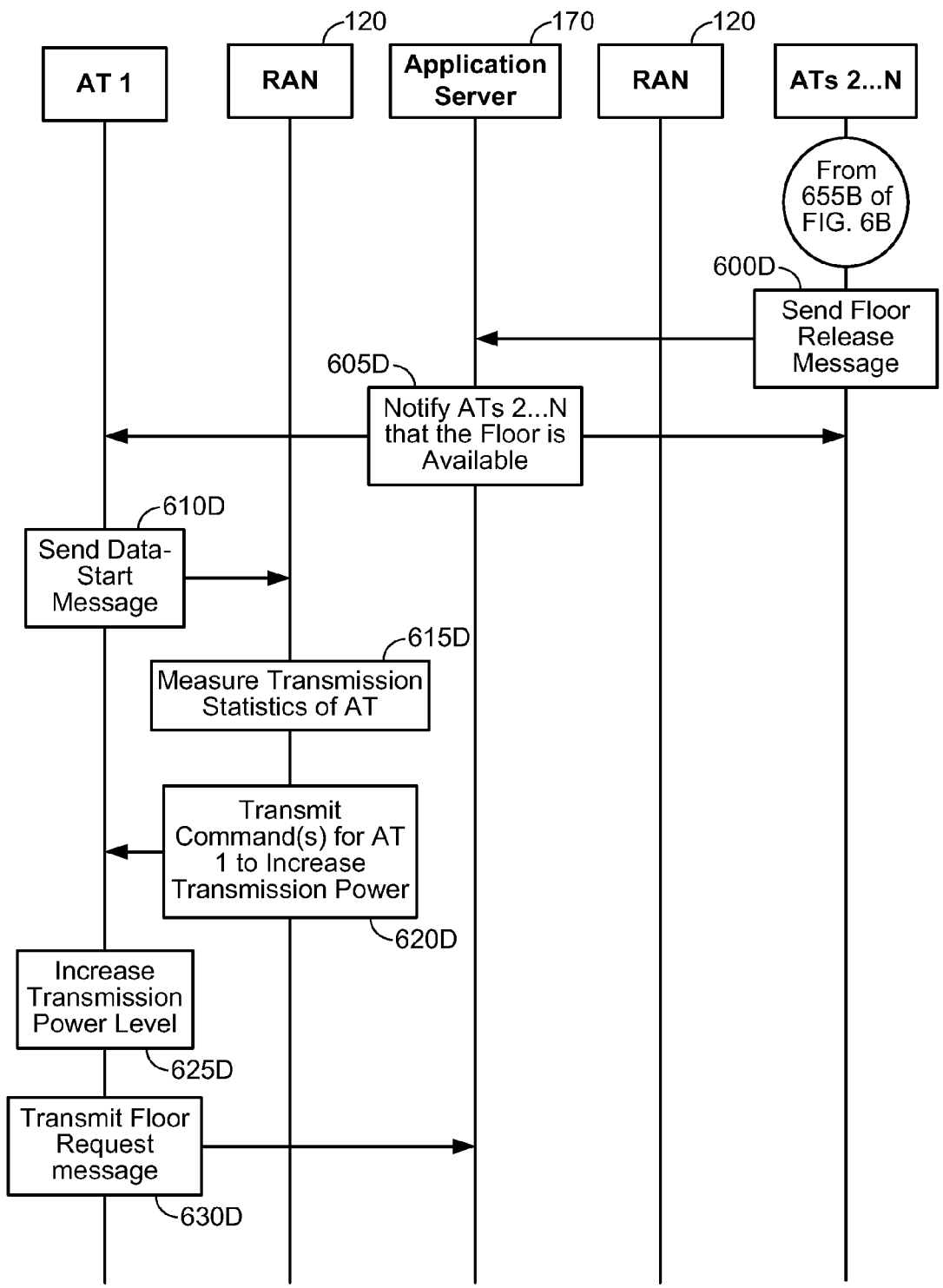
FIG. 6D illustrates an alternative continuation of the process of FIG. 6B according to an embodiment of the present invention.

Referring to FIG. 6A, AT 1 transmits data on a reverse link to the RAN 120. While not shown in FIG. 6A, assume that the RAN 120 measures the transmitted data messages from 600 and, sends one or more power level adjustment messages to command AT 1 to modify its transmission power level setpoint for reverse link transmissions. In 605, AT 1 determines to stop transmitting data for a given period of time (e.g., although AT 1 continues to send periodic pilot signals). For example, the determination of 605 may correspond to a user of AT 1 deciding to release the floor of a group session, ending a communication session, pressing a 'mute' button on a conference call, etc.

Conventionally, AT 1 would not notify the RAN 120 that AT 1 is not expected to be transmitting data for a given period of time, but rather simply stops transmitting the data. However, in embodiments of the invention, AT 1 transmits a data-stop message, 610, that informs the RAN 120 that AT 1 will not be transmitting data until further notice. In an example, the data-stop message of 610 may correspond to a proprietary message on the reverse link (e.g., such as a StorageBlobNotification or StorageBlobComplete message configured to inform the RAN 120 of AT 1's expectation to cease data transmission). In an alternative example, it is possible that a data-stop message could be lost when transmitted over the air interface between AT 1 and the RAN 120, or even that the data-stop message was never actually transmitted at all. In either case, the RAN 120 can be configured to infer a data-stop message based on a period of data inactivity from AT 1 lasting more than a threshold period of time. Thus, the threshold period of time in this example becomes the longest period of time after a previous data transmission before the power level adjustment messages reducing the transmission power level setpoint are sent, as will be described below with respect to 615 and 620.

The RAN 120 receives the data-stop message, and in response to the data-stop message, the RAN 120 transmits one or more power level adjustment messages to AT 1 that instruct AT 1 to lower its transmission power level setpoint, 615. For example, the RAN 120 may continue to transmit power level adjustment messages until AT 1 is expected to reach a transmission power level for AT 1's pilot signal transmissions over the TCH that is established for ATs during data inactivity periods. Alternatively, the RAN 120 may send a fixed number of power level adjustment messages to cause a fixed amount of decrease to AT 1's transmission power level setpoint. AT 1 receives the one or more power level adjustment messages and decreases its transmission power level setpoint accordingly, 620. Thus, the pilot signal transmissions for AT 1 over the TCH can be kept at relatively low power levels during the data inactivity period, which both reduces power consumption at AT 1 and decreases system interference.

In 625, AT 1 determines whether conditions are detected that indicate that AT 1 has a relatively high or certain probability of transmitting data within a threshold period of time (e.g., 200 ms, 2 s, etc.). For example, the detection of 625 can be in response to downlink data inactivity of a monitored communication session, from which AT 1 can infer that a current floor-holder is likely to soon give up the floor. Alternatively, the detection of 625 can be in response an actual floor-release message received in association with the monitored communication session. In another alternative example, the detection of 625 can be based on user input from a user of AT 1 (e.g., a user of AT 1 begins pushing buttons on AT 1 to enter a phone number, from which AT 1 can infer the user will then dial the phone number when the entry is complete). In a further example, the determination of 625 can be based on past user behavior. For example, if AT 1 corresponds to a mobile phone that has an accelerometer that detects motion of AT 1, assume that each time a user of AT 1 removes AT 1 from his/her pocket and places AT 1 close to his/her mouth AT 1 is used to initiate a voice-dialing operation. In this case, the accelerometer can be used as a trigger to prepare for an expected data transmission by AT 1. The user's past behavior can be stored on AT 1, with a table storing a set of known user behaviors with a probability that those behaviors will result in a data transmission within a given threshold period of time. For example, if a user of AT 1 loads a text message, Instant Message or email application and enters a series of keystrokes adding data to the message, AT 1 can infer that the user will, in the near future, request transmission of the message. In another example, the session/transport layer may also have logic/transactions that provide a prediction of a potential or likely data transmission (e.g., if HTTP/TCP exhibit intermittent activities spread over many seconds). In other words, a pattern of data transmission (e.g., one data transmission per minute) can be used to infer future data transmission activity.

If the determination of 625 indicates that AT 1 desires to transmit data, or expects a likelihood that AT 1 will soon desire to transmit data, AT 1 transmits a data-start message, 630. In an example, the data-start message of 630 may correspond to a proprietary message on the reverse link (e.g., such as a StorageBlobNotification or Complete message configured to inform the RAN 120 of AT 1's expectation to renew data transmission). In another example, the data-start message of 630 may correspond to any message from which the RAN 120 can measure transmission statistics to ascertain whether to make adjustments to AT 1's transmission power level setpoint (e.g., such as the low-load data message from 520 and 525 of FIG. 5A, in an example). In a further example, in certain circumstances, it will be appreciated that the data-start message of 630 can be sent in advance of an actual data transmission from AT 1, which can provide sufficient time to adjust AT 1's transmission power level setpoint for an initial data transmission after the data inactivity period.

The RAN 120 measures the transmission statistics associated with the data-start message in 635, and transmits one or more power level adjustment messages to increase AT 1's transmission power level setpoint, 640. In an alternative example, the RAN 120 can respond automatically to the data-start message by sending the power level adjustment messages because the RAN 120 is aware that AT 1's transmission power level setpoint has likely been maintained at an artificially low level during the data inactivity period initiated by the preceding data-stop message. AT 1 receives the power level adjustment message(s) and adjusts its transmission power level setpoint accordingly, 645. In 650, AT 1 determines whether to actually send data to the RAN 120 on the reverse link. If AT 1 determines to send data to the RAN 120 in 650, AT 1 transmits the data at the transmission power level setpoint established in 645. While not shown in FIG. 6A, if AT 1 determines not to send data in 650 (e.g., because a floor release message was received at AT 1, but a user of AT 1 decided not to request the floor, etc.), the process can return to 610 and another data-stop message can be sent to the RAN 120, which will again scale down AT 1's transmission power level setpoint.

In an alternative example, the data-start message can be configured to flag a degree of expected data transfer from AT 1. For example, if AT 1 intends to sends a relatively high amount of data, the high-data transfer can be conveyed to the RAN 120 via the data-start message. In this case, the RAN 120 may more aggressively increase AT 1's transmission power level setpoint, either by increasing the step-size or setpoint adjustment of each power level adjustment messages, or by sending a higher number of power level adjustment messages that indicate a setpoint increase.

In another alternative example, if AT 1 intends to transmit certain high-priority messages without sufficient notice such that the data-start message would not have enough time to ramp-up AT 1's transmission power level setpoint in the manner described above, or if a data-start message is sent by AT 1, but for some reason the data-start message has been lost (e.g., over the air interface between AT 1 and the RAN 120), AT 1 can send the high-priority message(s) at an increased transmission power level (i.e., higher than its current transmission power level setpoint) autonomously to increase the success rate of the data transmission. For example, if a user of AT 1 presses a PTT button on AT 1, and AT 1 has an artificially low transmission power level setpoint due to reverse link data transmission inactivity, the PTT request transmitted from AT 1 to the RAN 120 can be transmitted at an increased transmission power level. In an alternative example, AT 1 may infer that a data packet is lost based on not receiving lower layer SLP ACKs or RLP ACKs/NAKs when transmitting the Data Start message. In this case, AT 1 may increase its transmission power level due to the inferred packet loss.

Above, FIG. 6A has been described at a high-level applicable to any type of data inactivity period. Below, FIGS. 6B through 6D are directed to the general process of FIG. 6A applied with respect to the communication session established in FIG. 4A (e.g., a group session supported by IP unicasting, such as a PTT session, where each call participant has a TCH). Thus, with respect to FIG. 6B, assume that the process of FIG. 4A executes, and the process then advances to 600B of FIG. 6B. In 600B, AT 1 determines to release the floor for the communication session, and AT 1 sends a floor release message to the application server 170 via the RAN 120, 605B. The application server 170 notifies ATs 2 . . . N that the floor is now available, 610B, and at least one of ATs 2 . . . N requests the floor, 615B. Turning back to AT 1, because AT 1 determined to release the floor in 600B, AT 1 also sends a data-stop message to the RAN 120, 620B, which indicates that AT 1 is going to stop transmitting data messages over a reverse link TCH, although AT 1 still sends a periodic reverse link pilot signal. In response to the data-stop message, the RAN 120 transmits one or more power level adjustment messages, 625B, that instruct AT 1 to decrease its transmission power level setpoint to a given level (e.g., the transmission power level setpoint that is established for ATs during data inactivity periods). AT 1 receives the power level adjustment message(s) and lowers its transmission power level setpoint accordingly. While not shown, this means that AT 1's pilot signal will be transmitted at a lower transmission power level for a period of time. However, in at least one embodiment, the transmission power level for AT 1's pilot signal during periods of reverse link data inactivity may be maintained above a threshold level. For example, if AT 1's pilot transmission power level drops too low, a "Data Link" between AT 1 and the RAN 120 may be lost, and channel elements at the RAN 120 may be de-allocated and the TCH torn down. Thus, if loss of the Data Link is suspected or detected, the BTS may inform the BSC, and the BSC can increase the pilot power of AT 1 by increasing the setpoint. It will be appreciated that considerations related to loss of the Data Link are not performed in the conventional art discussed above because AT 1's transmission power level setpoint is set to an artificially low level only in embodiments of the invention. As will be appreciated, with respect to FIGS. 6B and 6A, respectively, 600B corresponds to 605, 620B corresponds to 610, 625B corresponds to 615 and 630B corresponds to 620.

Turning back to the application server 170, after receiving the floor request(s) in 615B, the application server 170 determines to grant one of the floor requests and sends a floor grant message to one of ATs 2 . . . N, 635B. The new floor-holder begins transmitting data, 640B, which is forwarded by the application server 170 to AT 1 as well as any other group members among ATs 2 . . . N other than the current floor-holder, 645B, each of which monitors the communication session, 650B and 655B.

FIGS. 6C and 6D illustrate alternative continuations of the process of FIG. 6B. Accordingly, with respect to FIG. 6C, after 655B of FIG. 6B, assume the new floor-holder stops transmitting data at some point during the communication session, 600C (e.g., while not shown, the RAN 120 can reduce the transmission power level setpoint of the new floor-holder based on an inferred data-stop message, as in FIG. 6A or 6B with respect to AT 1). Accordingly, the application server 170 stops forwarding data for the communication session, 605C. However, in this example, assume that the application server 170 does not yet release the floor. Despite AT 1 not being notified that the floor is available, the downlink data inactivity of the communication session as detected by AT 1 can infer that the floor will be released relatively soon. Accordingly, if data inactivity is detected in the communication session in 610C, AT 1 can infer that the floor is going to be open to contention relatively soon, and can send a data-start message, 615C, such that AT 1's transmission power level setpoint can be set to an appropriate level if the user of AT 1 determines to request the floor when the floor release notification arrives. The RAN 120 measures transmission statistics based on the data-start message, 620C, and sends one or more power level adjustment messages to AT 1, to set AT 1's transmission power level setpoint to an appropriate level for data transmission, 625C. AT 1 receives the power level adjustment message(s) and adjusts its transmission power level setpoint accordingly, 630C. While not shown explicitly in FIG. 6C, this also means AT 1's pilot signal over the TCH will be transmitted at a higher transmission power level.

Next, in 635C, AT 1, as well as any group members among ATs 2 . . . N, receives a notification from the application server 170 indicating that the floor is available for contention. Accordingly, AT 1 transmits a floor request message (e.g., in response to a prompt form the user of AT 1), 640C, at a transmission power level corresponding to the adjusted (i.e., increased) transmission power level setpoint. As will be appreciated by one of ordinary skill in the art, with respect to FIGS. 6C and 6A, respectively, 610C corresponds to 625, 615C corresponds to 630, 620C corresponds to 635, 625C corresponds to 640, 630C corresponds to 645 and 640C corresponds to 655.

Turning to FIG. 6D, after 655B of FIG. 6B, assume the new floor-holder sends a floor release message at some point during the communication session, 600D. Unlike FIG. 6C, assume that no downlink data inactivity in the communication session is detected by AT 1 before the new floor-holder decides to give up the floor. Accordingly, in 605D, AT 1, as well as any group members among ATs 2 . . . N, receives a notification from the RAN 120 that the floor is available for contention. Because the floor is now open for contention, AT 1 becomes aware of the possibility that a subsequent floor request message may be triggered by a user of AT 1, such that a data transmission becomes likely and/or possible. Thus, the receipt of the floor release notification qualifies as a detection, at AT 1, that AT 1 may soon be required to transmit data. Accordingly, AT 1 sends a data-start message, 610D, such that AT 1's transmission power level setpoint can be set to an appropriate level if the user of AT 1 determines to request the floor. As will be appreciated, because users rarely respond instantly to incoming calls or notifications, a given amount of lag time before AT 1 is required to transmit data is likely (e.g., 500 ms or more), such that the data-start message of 610D may be sent with enough time for AT 1's transmission power level setpoint to be adjusted to a more appropriate level for data transmission. Accordingly, the RAN 120 measures transmission statistics based on the data-start message, 615D, and sends one or more power level adjustment messages to AT 1 to set AT 1's transmission power level setpoint to an appropriate level for transmission, 620D. AT 1 receives the power level adjustment message(s) and adjusts (i.e., increases) its transmission power level setpoint accordingly, 625D.

Next, AT 1 transmits a floor request message (e.g., in response to a prompt from the user of AT 1), 630D, at a transmission power level corresponding to the adjusted transmission power level setpoint. As will be appreciated by one of ordinary skill in the art, with respect to FIGS. 6D and 6A, respectively, 605D corresponds to 625, 610D corresponds to 630, 615D corresponds to 635, 620D corresponds to 640, 625D corresponds to 645 and 630d corresponds to 655.

As will be appreciated by one of ordinary skill in the art, while the data-start and data-stop messages are described in FIGS. 6B to 6D with respect to AT 1 only, it will be appreciated that these messages may also be send by any of ATs 2 . . . N, where appropriate. In other words, the process described with respect to AT 1 in FIGS. 6B through 6D (e.g., conveying information to the RAN 120 of an AT's expected intent regarding future data transmissions) can potentially be applied at other ATs within the communication system 100.

In view of the embodiments of the invention described above, it will be appreciated that drift or inaccuracy associated with transmission power level setpoints for an AT's reverse link transmission occurring during data inactivity periods can be reduced in a number of ways. For example, the AT can be configured to send periodic low-load data messages to the RAN 120, which permits the RAN 120 to adjust the AT's transmission power level setpoint (e.g., for a particular flow or TCH, for all data transmissions, etc.) throughout the data inactivity period based on changing conditions, instead of simply increasing the setpoint automatically (e.g., FIG. 4B) or making no changes to the setpoint at all (e.g., FIG. 4C). Alternatively, the AT can be configured to convey, to the RAN 120, information related to when AT 1 expects to stop sending data (e.g., a data-stop signal), and/or information related to when AT 1 expects to begin sending data again (e.g., a data-start signal). In this way, AT 1's transmission power level setpoint can be lowered during reverse link data inactivity periods to reduce pilot signal transmission power over a TCH, and AT 1's transmission power level setpoint can be re-established or reset to an appropriate level in time for an initial data transmission to be transmitted at the appropriate transmission power level, based on a target level for transmission statistics measured by the RAN 120.

Further, while not described above in detail, the degree to which an AT adjusts its transmission power level setpoint in response to a particular power level adjustment message can be dynamically set by the RAN 120 based on one or more criteria. For example, the setpoint step-size can be established based on methodologies described within "A Reverse Link Outer-Loop Power Control Algorithm for CDMA2000 1xEVsystems", by Rashid Attar and E. Esteves, published on Aug. 7, 2002 on pages 573-578 of Communications, 2002. ICC 2002. IEEE International Conference, which is incorporated herein by reference in its entirety. The above-incorporated article describes reverse link outer-loop power control (ROLPC) algorithms developed for voice systems that operate based on a continuous stream of packets (CRC events) to adjust the transmission power level setpoint, where the setpoint is conservatively adapted to the channel in the absence of packets, with fast convergence at the start of a transmission.

Further, while references are made above to an "ideal" or "appropriate" transmission power level setpoint, it will be appreciated that this level is relative to target transmission statistics for the AT. The actual transmission statistics (e.g., PER, SINR, etc.) for the AT are measured at the RAN 120, and compared against the target transmission statistics, with the transmission power level setpoint being adjusted when necessary to maintain the transmission statistics close to the target transmission statistics. In a further example, both the target transmission statistics and 'ideal' transmission power level setpoint (e.g., which can change significantly with time as conditions change) can correspond to ranges, and not discrete or specific points.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of managing a reverse link transmission power level setpoint during periods of data inactivity on a reverse link traffic channel in a wireless communications system, comprising:
   determining, at an access terminal that is actively monitoring downlink transmissions associated with a communication session, that no reverse link data transmissions from the access terminal to an access network have occurred on the reverse link traffic channel in more than a threshold period of time, the threshold period of time established at least in part based on one or more criteria associated with expected drift of a transmission power level setpoint of the access terminal during periods of reverse link data transmission inactivity;
   generating a message based on the determining; and
   transmitting, while the access terminal continues to monitor downlink transmissions associated with the communication session, the message on the reverse link traffic channel to the access network at a first transmission power level based on a current transmission power level setpoint of the access terminal, the transmitted message sufficient for the access network to measure transmission statistics from which the access network can determine whether to adjust the current transmission power level setpoint of the access terminal.

2. The method of claim 1, further comprising:
   receiving, in response to the transmitting, one or more power level adjustment messages from the access network, the one or more power level adjustment messages each instructing the access terminal to increase or decrease the transmission power level setpoint; and
   adjusting the current transmission power level setpoint in accordance with the one or more power level adjustment messages.

3. The method of claim 2, further comprising:
   repeating the determining and the generating; and
   transmitting the message on the reverse link traffic channel to the access network at a second transmission power level based on the adjusted transmission power level setpoint of the access terminal.

4. The method of claim 2, further comprising:
   determining to send data to the access network; and
   transmitting the data on the reverse link traffic channel to the access network at a second transmission power level based on the adjusted transmission power level setpoint of the access terminal.

5. The method of claim 1, further comprising:
   transmitting a periodic pilot signal on the reverse link traffic channel based on the current transmission power level setpoint, the periodic pilot signal not qualifying as a data transmission that ends a period of reverse link data transmission inactivity.

6. A method of managing a reverse link transmission power level setpoint during periods of reverse link data inactivity on a reverse link traffic channel in a wireless communications system, comprising:
   entering a state that is characterized by predicted future traffic inactivity on the reverse link traffic channel for an access terminal;
   transmitting a message to an access network that includes an indication that indicates the access terminal will not be transmitting data on the reverse link traffic channel for a given period of time due to the predicted future traffic inactivity of the state;
   receiving, prior to the given period of time elapsing, one or more power level adjustment messages in response to the indication in the transmitted message irrespective of a quality level at which the access network receives the transmitted message, the one or more power level adjustment messages instructing the access terminal to decrease a transmission power level setpoint of the access terminal; and
   decreasing the transmission power level setpoint of the access terminal in accordance with the one or more power level adjustment messages.

7. The method of claim 6, further comprising:
   transmitting a periodic pilot signal on the reverse link traffic channel based on the decreased transmission power level setpoint at least until another message is sent to the access network that indicates the access terminal expects to transmit or is transmitting data, the periodic pilot signal not qualifying as a data transmission that ends a period of reverse link data transmission inactivity.

8. The method of claim 6, further comprising:
   detecting conditions indicative of a possible data transmission from the access terminal within a threshold period of time;
   sending another message to the access network that indicates the access terminal may transmit data on the reverse link traffic channel within the threshold period of time;
   receiving one or more additional power level adjustment messages in response to the transmitted another message, the one or more additional power level adjustment messages instructing the access terminal to increase a transmission power level setpoint of the access terminal; and
   increasing the transmission power level setpoint of the access terminal in accordance with the one or more power level adjustment messages.

9. The method of claim 8, further comprising:
   determining to transmit data from the access terminal to the access network; and transmitting data on the reverse link traffic channel to the access network based on the increased transmission power level setpoint.

10. The method of claim 9, wherein the conditions indicative of the possible data transmission from the access terminal within the threshold period of time include one or more of (i) user input from a user of the access terminal, (ii) a floor release message for a group communication session, (iii) a period of downlink inactivity for the group communication session and (iv) a prediction based on an evaluation of past user behavior and current user behavior at the access terminal.

11. The method of claim 6, further comprising:
determining to transmit data from the access terminal to the access network; and
transmitting the data at a transmission power level higher than called for by the transmission power level setpoint if the data has a high priority.

12. A method of operating an access terminal that is configured to manage a reverse link transmission power level setpoint during periods of reverse link data inactivity on a reverse link traffic channel in a wireless communications system, comprising:
determining, during a period of reverse link data transmission inactivity, whether conditions are present indicative of a potential reverse link data transmission from the access terminal to an access network;
transmitting, in advance of the potential reverse link data transmission being transmitted to the access network, a message to the access network at a first transmission power level, based on a current transmission power level setpoint, to request that the current transmission power level setpoint of the access terminal be adjusted to a level sufficient to satisfy a given success rate;
receiving, in response to the transmitted message, one or more power level adjustment messages instructing the access terminal to adjust the current transmission power level setpoint; and
adjusting the current transmission power level setpoint of the access terminal in accordance with the one or more power level adjustment messages.

13. The method of claim 12, further comprising:
transmitting the potential reverse link data transmission to the access network at a second transmission power level based on the adjusted transmission power level setpoint.

14. The method of claim 12, wherein the conditions indicative of the potential reverse link data transmission include one or more of (i) user input from a user of the access terminal, (ii) a floor release message for a group communication session, (iii) a period of downlink inactivity for the group communication session and (iv) a prediction based on an evaluation of past user behavior and current user behavior at the access terminal.

15. The method of claim 12, wherein the current transmission power level setpoint is set to an artificially low level during the period of reverse link data transmission inactivity.

16. The method of claim 15, wherein the one or more power level adjustment messages instructing the access terminal to increase the current transmission power level setpoint.

17. A method of managing a reverse link transmission power level setpoint during periods of reverse link data inactivity on a reverse link traffic channel in a wireless communications system, comprising:
receiving a message at an access network that includes an indication that indicates an access terminal will not be transmitting data on the reverse link traffic channel for a given period of time that is due to a predicted future traffic inactivity characteristic of a state of the access terminal; and
transmitting, prior to the given period of time elapsing, one or more power level adjustment messages in response to the indication in the received message irrespective of a quality level at which the access network receives the received message, the one or more power level adjustment messages instructing the access terminal to decrease a transmission power level setpoint of the access terminal.

18. The method of claim 17, further comprising:
receiving a periodic pilot signal from the access terminal on the reverse link traffic channel based on the decreased transmission power level setpoint at least until another message is received at the access network that indicates the access terminal expects to transmit or is transmitting data, the periodic pilot signal not qualifying as a data transmission that ends a period of reverse link data transmission inactivity.

19. The method of claim 17, further comprising:
receiving another message to the access network that indicates the access terminal may transmit data on the reverse link traffic channel within a threshold period of time; and
transmitting one or more additional power level adjustment messages in response to the received another message, the one or more additional power level adjustment messages instructing the access terminal to increase a transmission power level setpoint of the access terminal.

20. The method of claim 19, further comprising:
receiving data from the access terminal on the reverse link traffic channel from the access network based on the increased transmission power level setpoint.

21. The method of claim 17, further comprising:
receiving data at a transmission power level higher than called for by the access terminal's decreased transmission power level setpoint if the data has a high priority.

22. A method of managing a reverse link transmission power level setpoint during periods of reverse link data inactivity on a reverse link traffic channel in a wireless communications system, comprising:
receiving, in advance of a potential reverse link data transmission being transmitted to an access network, a message from an access terminal at a first transmission power level based on a current transmission power level setpoint of the access terminal, to request that the current transmission power level setpoint of the access terminal be adjusted to a level sufficient to satisfy a given success rate;
transmitting, in response to the received message, one or more power level adjustment messages instructing the access terminal to adjust the current transmission power level setpoint; and
receiving the potential reverse link data transmission at the access network at a second transmission power level based on the adjusted transmission power level setpoint.

23. The method of claim 22, wherein the current transmission power level setpoint is set to an artificially low level during one of the periods of reverse link data transmission inactivity.

24. The method of claim 23, wherein the one or more power level adjustment messages instructing the access terminal to increase the current transmission power level setpoint.

25. An access terminal in a wireless communications system, the access terminal assigned a reverse link traffic channel and configured to transmit data on the reverse link traffic channel at a transmission power level based at least in part on a reverse link transmission power level setpoint, comprising:
- means for determining, while the access terminal is actively monitoring downlink transmissions associated with a communication session, that no reverse link data transmissions from the access terminal to an access network have occurred on the reverse link traffic channel in more than a threshold period of time, the threshold period of time established at least in part based on one or more criteria associated with expected drift of a transmission power level setpoint of the access terminal during periods of reverse link data transmission inactivity;
- means for generating a message based on the determination of the means for determining; and
- means for transmitting, while the access terminal continues to monitor downlink transmissions associated with the communication session, the message on the reverse link traffic channel to the access network at a first transmission power level based on a current transmission power level setpoint of the access terminal, the transmitted message sufficient for the access network to measure transmission statistics from which the access network can determine whether to adjust the current transmission power level setpoint of the access terminal.

26. The access terminal of claim 25, further comprising:
- means for receiving, in response to the message transmission, one or more power level adjustment messages from the access network, the one or more power level adjustment messages each instructing the access terminal to increase or decrease the transmission power level setpoint; and
- means for adjusting the current transmission power level setpoint in accordance with the one or more power level adjustment messages.

27. An access terminal in a wireless communications system, the access terminal assigned a reverse link traffic channel and configured to transmit data on the reverse link traffic channel at a transmission power level based at least in part on a reverse link transmission power level setpoint, comprising:
- means for entering a state that is characterized by predicted future traffic inactivity on the reverse link traffic channel for the access terminal;
- means for transmitting a message to an access network that includes an indication that indicates the access terminal will not be transmitting data on the reverse link traffic channel for a given period of time due to the predicted future traffic inactivity of the state;
- means for receiving, prior to the given period of time elapsing, one or more power level adjustment messages in response to the indication in the transmitted message irrespective of a quality level at which the access network receives the transmitted message, the one or more power level adjustment messages instructing the access terminal to decrease a transmission power level setpoint of the access terminal; and
- means for decreasing the transmission power level setpoint of the access terminal in accordance with the one or more power level adjustment messages.

28. The access terminal of claim 27, further comprising:
- means for detecting conditions indicative of a possible data transmission from the access terminal within a threshold period of time;
- means for sending another message to the access network that indicates the access terminal may transmit data on the reverse link traffic channel within the threshold period of time;
- means for receiving one or more additional power level adjustment messages in response to the transmitted message, the one or more additional power level adjustment messages instructing the access terminal to increase a transmission power level setpoint of the access terminal; and
- means for increasing the transmission power level setpoint of the access terminal in accordance with the one or more power level adjustment messages.

29. An access terminal in a wireless communications system, the access terminal assigned a reverse link traffic channel and configured to transmit data on the reverse link traffic channel at a transmission power level based at least in part on a reverse link transmission power level setpoint, comprising:
- means for determining, during a period of reverse link data transmission inactivity, whether conditions are present indicative of a potential reverse link data transmission from the access terminal to an access network;
- means for transmitting, in advance of the potential reverse link data transmission being transmitted to the access network, a message to the access network at a first transmission power level, based on a current transmission power level setpoint, to request that the current transmission power level setpoint of the access terminal be adjusted to a level sufficient to satisfy a given success rate;
- means for receiving, in response to the transmitted message, one or more power level adjustment messages instructing the access terminal to adjust the current transmission power level setpoint; and
- means for adjusting the current transmission power level setpoint of the access terminal in accordance with the one or more power level adjustment messages.

30. The access terminal of claim 29, further comprising:
- means for transmitting the potential reverse link data transmission to the access network at a second transmission power level based on the adjusted transmission power level setpoint.

31. The access terminal of claim 29, wherein the current transmission power level setpoint is set to an artificially low level during the period of reverse link data transmission inactivity.

32. An access network in a wireless communications system, the access network configured to assign a reverse link traffic channel to an access terminal and configured to receive data on the reverse link traffic channel at a transmission power level based at least in part on a reverse link transmission power level setpoint, comprising:
- means for receiving a message at the access network that includes an indication that indicates the access terminal will not be transmitting data on the reverse link traffic channel for a given period of time that is due to a predicted future traffic inactivity characteristic of a state of the access terminal; and
- means for transmitting, prior to the given period of time elapsing, one or more power level adjustment messages in response to the indication in the received message irrespective of a quality level at which the access network receives the received message, the one or more power level adjustment messages instructing the access terminal to decrease a transmission power level setpoint of the access terminal.

33. The access network of claim 32, further comprising:
- means for receiving another message to the access network that indicates the access terminal may transmit data on the reverse link traffic channel within a threshold period of time; and means for transmitting one or more additional power level adjustment messages in response to the received another message, the one or more additional power level adjustment messages instructing the access terminal to increase a transmission power level setpoint of the access terminal.

34. An access network in a wireless communications system, the access network configured to assign a reverse link traffic channel to an access terminal and configured to receive data on the reverse link traffic channel at a transmission power level based at least in part on a reverse link transmission power level setpoint, comprising:
   means for receiving, in advance of a potential reverse link data transmission being transmitted to the access network, a message from the access terminal at a first transmission power level, based on a current transmission power level setpoint of the access terminal, to request that the current transmission power level setpoint of the access terminal be adjusted to a level sufficient to satisfy a given success rate;
   means for transmitting, in response to the received message, one or more power level adjustment messages instructing the access terminal to adjust the current transmission power level setpoint; and
   means for receiving the potential reverse link data transmission at the access network at a second transmission power level based on the adjusted transmission power level setpoint.

35. The access network of claim 34, wherein the current transmission power level setpoint is set to an artificially low level during a period of reverse link data transmission inactivity.

36. An access terminal in a wireless communications system, the access terminal assigned a reverse link traffic channel and configured to transmit data on the reverse link traffic channel at a transmission power level based at least in part on a reverse link transmission power level setpoint, comprising:
   logic configured to determine, while the access terminal is actively monitoring downlink transmissions associated with a communication session, that no reverse link data transmissions from the access terminal to an access network have occurred on the reverse link traffic channel in more than a threshold period of time, the threshold period of time established at least in part based on one or more criteria associated with expected drift of a transmission power level setpoint of the access terminal during periods of reverse link data transmission inactivity;
   logic configured to generate a message based on the determination of the logic configured to determine; and
   logic configured to transmit, while the access terminal continues to monitor downlink transmissions associated with the communication session, the message on the reverse link traffic channel to the access network at a first transmission power level based on a current transmission power level setpoint of the access terminal, the transmitted message sufficient for the access network to measure transmission statistics from which the access network can determine whether to adjust the current transmission power level setpoint of the access terminal.

37. The access terminal of claim 36, further comprising:
   logic configured to receive, in response to the message transmission, one or more power level adjustment messages from the access network, the one or more power level adjustment messages each instructing the access terminal to increase or decrease the transmission power level setpoint; and
   logic configured to adjust the current transmission power level setpoint in accordance with the one or more power level adjustment messages.

38. An access terminal in a wireless communications system, the access terminal assigned a reverse link traffic channel and configured to transmit data on the reverse link traffic channel at a transmission power level based at least in part on a reverse link transmission power level setpoint, comprising:
   logic configured to enter a state that is characterized by predicted future traffic inactivity on the reverse link traffic channel for the access terminal;
   logic configured to transmit a message to an access network that includes an indication that indicates the access terminal will not be transmitting data on the reverse link traffic channel for a given period of time due to the predicted future traffic inactivity of the state;
   logic configured to receive, prior to the given period of time elapsing, one or more power level adjustment messages in response to the indication in the transmitted message irrespective of a quality level at which the access network receives the transmitted message, the one or more power level adjustment messages instructing the access terminal to decrease a transmission power level setpoint of the access terminal; and
   logic configured to decrease the transmission power level setpoint of the access terminal in accordance with the one or more power level adjustment messages.

39. The access terminal of claim 38, further comprising:
   logic configured to detect conditions indicative of a possible data transmission from the access terminal within a threshold period of time;
   logic configured to send another message to the access network that indicates the access terminal may transmit data on the reverse link traffic channel within the threshold period of time;
   logic configured to receive one or more additional power level adjustment messages in response to the transmitted message, the one or more additional power level adjustment messages instructing the access terminal to increase a transmission power level setpoint of the access terminal; and
   logic configured to increase the transmission power level setpoint of the access terminal in accordance with the one or more power level adjustment messages.

40. An access terminal in a wireless communications system, the access terminal assigned a reverse link traffic channel and configured to transmit data on the reverse link traffic channel at a transmission power level based at least in part on a reverse link transmission power level setpoint, comprising:
   logic configured to determine, during a period of reverse link data transmission inactivity, whether conditions are present indicative of a potential reverse link data transmission from the access terminal to an access network;
   logic configured to transmit, in advance of the potential reverse link data transmission being transmitted to the access network, a message to the access network at a first transmission power level, based on a current transmission power level setpoint, to request that the current transmission power level setpoint of the access terminal be adjusted to a level sufficient to satisfy a given success rate;
   logic configured to receive, in response to the transmitted message, one or more power level adjustment messages instructing the access terminal to adjust the current transmission power level setpoint; and logic configured to adjust the current transmission power level setpoint of the access terminal in accordance with the one or more power level adjustment messages.

41. The access terminal of claim 40, further comprising:
logic configured to transmit the potential reverse link data transmission to the access network at a second transmission power level based on the adjusted transmission power level setpoint.

42. The access terminal of claim 40, wherein the current transmission power level setpoint is set to an artificially low level during the period of reverse link data transmission inactivity.

43. An access network in a wireless communications system, the access network configured to assign a reverse link traffic channel to an access terminal and configured to receive data on the reverse link traffic channel at a transmission power level based at least in part on a reverse link transmission power level setpoint, comprising:
logic configured to receive a message at the access network that includes an indication that indicates the access terminal will not be transmitting data on the reverse link traffic channel for a given period of time that is due to a predicted future traffic inactivity characteristic of a state of the access terminal; and
logic configured to transmit, prior to the given period of time elapsing, one or more power level adjustment messages in response to the indication in the received message irrespective of a quality level at which the access network receives the received message, the one or more power level adjustment messages instructing the access terminal to decrease a transmission power level setpoint of the access terminal.

44. The access network of claim 43, further comprising:
logic configured to receive another message to the access network that indicates the access terminal may transmit data on the reverse link traffic channel within a threshold period of time; and
logic configured to transmit one or more additional power level adjustment messages in response to the received another message, the one or more additional power level adjustment messages instructing the access terminal to increase a transmission power level setpoint of the access terminal.

45. An access network in a wireless communications system, the access network configured to assign a reverse link traffic channel to an access terminal and configured to receive data on the reverse link traffic channel at a transmission power level based at least in part on a reverse link transmission power level setpoint, comprising:
logic configured to receive, in advance of a potential reverse link data transmission being transmitted to the access network, a message from the access terminal at a first transmission power level, based on a current transmission power level setpoint of the access terminal, to request that the current transmission power level setpoint of the access terminal be adjusted to a level sufficient to satisfy a given success rate;
logic configured to transmit, in response to the received message, one or more power level adjustment messages instructing the access terminal to adjust the current transmission power level setpoint; and
logic configured to receive the potential reverse link data transmission at the access network at a second transmission power level based on the adjusted transmission power level setpoint.

46. The access network of claim 45, wherein the current transmission power level setpoint is set to an artificially low level during a period of reverse link data transmission inactivity.

47. A non-transitory computer-readable medium comprising instructions, which, when executed by an access terminal in a wireless communications system, the access terminal assigned a reverse link traffic channel and configured to transmit data on the reverse link traffic channel at a transmission power level based at least in part on a reverse link transmission power level setpoint, cause the access terminal to perform operations, the instructions comprising:
program code to determine, while the access terminal is actively monitoring downlink transmissions associated with a communication session, that no reverse link data transmissions from the access terminal to an access network have occurred on the reverse link traffic channel in more than a threshold period of time, the threshold period of time established at least in part based on one or more criteria associated with expected drift of a transmission power level setpoint of the access terminal during periods of reverse link data transmission inactivity;
program code to generate a message based on the determination of the program code to determine; and
program code to transmit, while the access terminal continues to monitor downlink transmissions associated with the communication session, the message on the reverse link traffic channel to the access network at a first transmission power level based on a current transmission power level setpoint of the access terminal, the transmitted message sufficient for the access network to measure transmission statistics from which the access network can determine whether to adjust the current transmission power level setpoint of the access terminal.

48. The non-transitory computer-readable medium of claim 47, further comprising:
program code to receive, in response to the message transmission, one or more power level adjustment messages from the access network, the one or more power level adjustment messages each instructing the access terminal to increase or decrease the transmission power level setpoint; and
program code to adjust the current transmission power level setpoint in accordance with the one or more power level adjustment messages.

49. A non-transitory computer-readable medium comprising instructions, which, when executed by an access terminal in a wireless communications system, the access terminal assigned a reverse link traffic channel and configured to transmit data on the reverse link traffic channel at a transmission power level based at least in part on a reverse link transmission power level setpoint, cause the access terminal to perform operations, the instructions comprising:
program code to enter a state that is characterized by predicted future traffic inactivity on the reverse link traffic channel for the access terminal;
program code to transmit a message to an access network that includes an indication that indicates the access terminal will not be transmitting data on the reverse link traffic channel for a given period of time due to the predicted future traffic inactivity of the state;
program code to receive, prior to the given period of time elapsing, one or more power level adjustment messages in response to the indication in the transmitted message irrespective of a quality level at which the access network receives the transmitted message, the one or more power level adjustment messages instructing the access terminal to decrease a transmission power level setpoint of the access terminal; and program code to decrease the transmission power level setpoint of the access terminal in accordance with the one or more power level adjustment messages.

50. The non-transitory computer-readable medium of claim 49, further comprising:
    program code to detect conditions indicative of a possible data transmission from the access terminal within a threshold period of time;
    program code to send another message to the access network that indicates the access terminal may transmit data on the reverse link traffic channel within the threshold period of time;
    program code to receive one or more additional power level adjustment messages in response to the transmitted message, the one or more additional power level adjustment messages instructing the access terminal to increase a transmission power level setpoint of the access terminal; and
    program code to increase the transmission power level setpoint of the access terminal in accordance with the one or more power level adjustment messages.

51. A non-transitory computer-readable medium comprising instructions, which, when executed by an access terminal in a wireless communications system, the access terminal assigned a reverse link traffic channel and configured to transmit data on the reverse link traffic channel at a transmission power level based at least in part on a reverse link transmission power level setpoint, cause the access terminal to perform operations, the instructions comprising:
    program code to determine, during a period of reverse link data transmission inactivity, whether conditions are present indicative of a potential reverse link data transmission from the access terminal to an access network;
    program code to transmit, in advance of the potential reverse link data transmission being transmitted to the access network, a message to the access network at a first transmission power level, based on a current transmission power level setpoint, to request that the current transmission power level setpoint of the access terminal be adjusted to a level sufficient to satisfy a given success rate;
    program code to receive, in response to the transmitted message, one or more power level adjustment messages instructing the access terminal to adjust the current transmission power level setpoint; and
    program code to adjust the current transmission power level setpoint of the access terminal in accordance with the one or more power level adjustment messages.

52. The non-transitory computer-readable medium of claim 51, further comprising:
    program code to transmit the potential reverse link data transmission to the access network at a second transmission power level based on the adjusted transmission power level setpoint.

53. The non-transitory computer-readable medium of claim 52, wherein the current transmission power level setpoint is set to an artificially low level during the period of reverse link data transmission inactivity.

54. A non-transitory computer-readable medium comprising instructions, which, when executed by an access network in a wireless communications system, the access network configured to assign a reverse link traffic channel to an access terminal and configured to receive data on the reverse link traffic channel at a transmission power level based at least in part on a reverse link transmission power level setpoint, cause the access network to perform operations, the instructions comprising:
    program code to receive a message at the access network that indicates the access terminal will not be transmitting data on the reverse link traffic channel for a given period of time that is due to a predicted future traffic inactivity characteristic of a state of the access terminal; and
    program code to transmit, prior to the given period of time elapsing, one or more power level adjustment messages in response to the indication in the received message irrespective of a quality level at which the access network receives the received message, the one or more power level adjustment messages instructing the access terminal to decrease a transmission power level setpoint of the access terminal.

55. The non-transitory computer-readable medium of claim 54, further comprising:
    program code to receive another message to the access network that indicates the access terminal may transmit data on the reverse link traffic channel within a threshold period of time; and
    program code to transmit one or more additional power level adjustment messages in response to the received another message, the one or more additional power level adjustment messages instructing the access terminal to increase a transmission power level setpoint of the access terminal.

56. A non-transitory computer-readable medium comprising instructions, which, when executed by an access network in a wireless communications system, the access network configured to assign a reverse link traffic channel to an access terminal and configured to receive data on the reverse link traffic channel at a transmission power level based at least in part on a reverse link transmission power level setpoint, cause the access network to perform operations, the instructions comprising:
    program code to receive, in advance of a potential reverse link data transmission being transmitted to the access network, a message from the access terminal at a first transmission power level, based on a current transmission power level setpoint of the access terminal, to request that the current transmission power level setpoint of the access terminal be adjusted to a level sufficient to satisfy a given success rate;
    program code to transmit, in response to the received message, one or more power level adjustment messages instructing the access terminal to adjust the current transmission power level setpoint; and
    program code to receive the potential reverse link data transmission at the access network at a second transmission power level based on the adjusted transmission power level setpoint.

57. The non-transitory computer-readable medium of claim 56, wherein the current transmission power level setpoint is set to an artificially low level during a period of reverse link data transmission inactivity.

* * * * *